United States Patent

[11] 3,603,937

[72] Inventors Edward Loizides
Poughkeepsie;
George F. Steigerwalt, Hyde Park, both of, N.Y.

[21] Appl. No. 836,930
[22] Filed June 26, 1969
[45] Patented Sept. 7, 1971
[73] Assignee International Business Machines Corporation
Armonk, N.Y.

[54] MULTILEVEL COMPRESSED INDEX GENERATION METHOD AND MEANS
42 Claims, 45 Drawing Figs.

[52] U.S. Cl. .......... 340/172.5
[51] Int. Cl. .......... G06f 7/22
[50] Field of Search .......... 340/172.5; 235/157, 154

[56] References Cited

UNITED STATES PATENTS

| | | | |
|---|---|---|---|
| 3,185,823 | 5/1965 | Ellersick, Jr. et al. ........ | 235/154 |
| 3,225,333 | 12/1965 | Vinal .......... | 340/172.5 |
| 3,242,470 | 3/1966 | Hagelbarger .......... | 340/172.5 |
| 3,289,169 | 11/1966 | Marosz .......... | 340/172.5 |
| 3,413,611 | 11/1968 | Pfuetze .......... | 340/172.5 |
| 3,490,690 | 1/1970 | Apple et al. .......... | 340/172.5 X |

*Primary Examiner*—Paul J. Henon
*Assistant Examiner*—Melvin B. Chapnick
*Attorneys*—Hanifin and Jancin and Bernard M. Goldman

ABSTRACT: A method and means for generating a multilevel compressed index. The high-level blocks of the index have an entry format of $CK_1$, $CK_2$, R in which R is a pointer to a next lower level compressed index block, and $CK_1$, and $CK_2$ are each compressed keys generated from uncompressed keys (UK's) represented by pointers on opposite sides of the end boundaries of select low-level compressed index blocks. The generated multilevel index can be searched using the invention described in U.S. application No. 836,825.

INVENTORS
EDWARD LOIZIDES
GEORGE F. STEIGERWALT

BY *Bernard M. Goldman*

ATTORNEY (*) NOTE: USED IN RELATED APPLICATION NO. 836825

FIG. 6 GENERATION MODE CLOCK CONTROLS
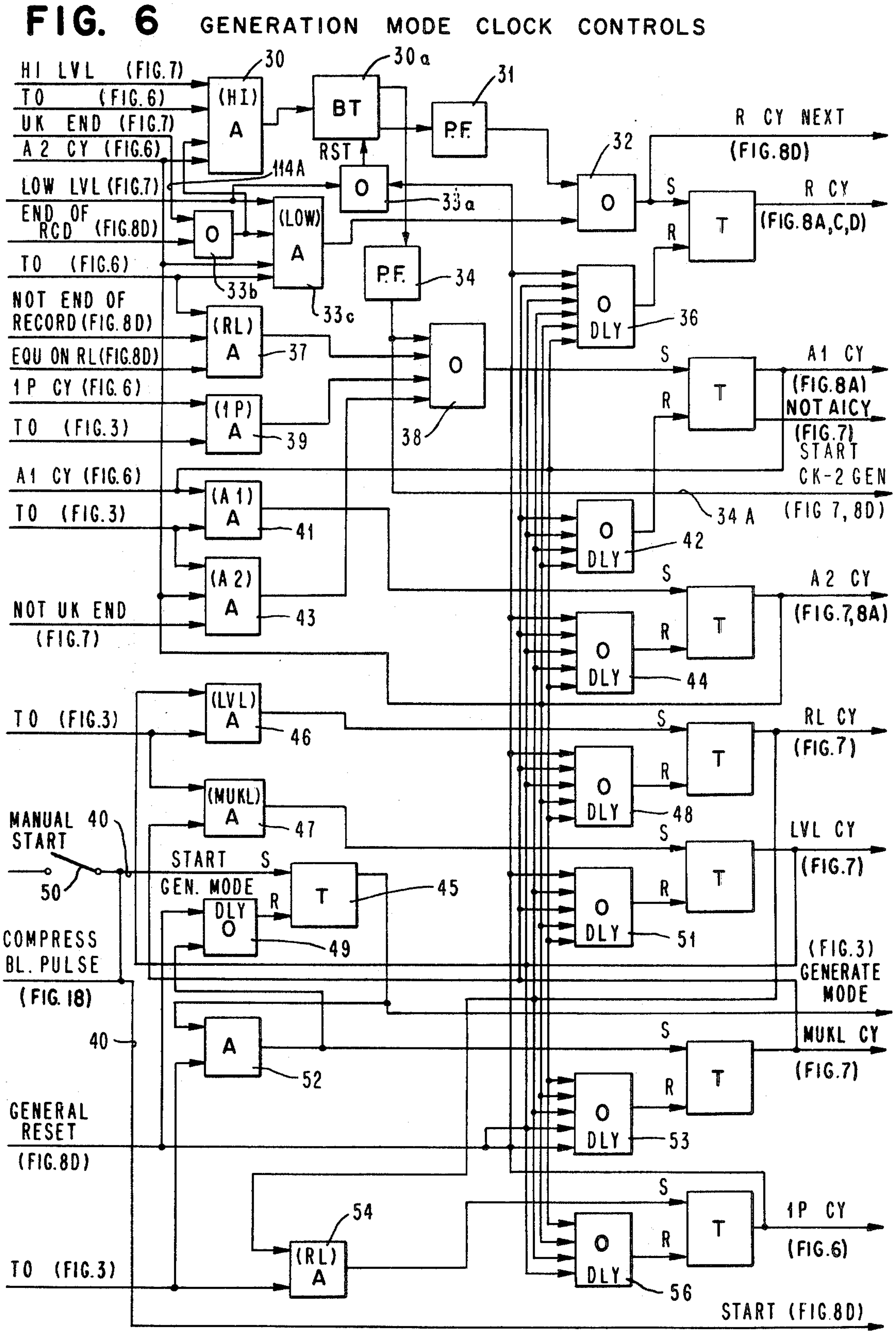

FIG. 8B (GENERATE)
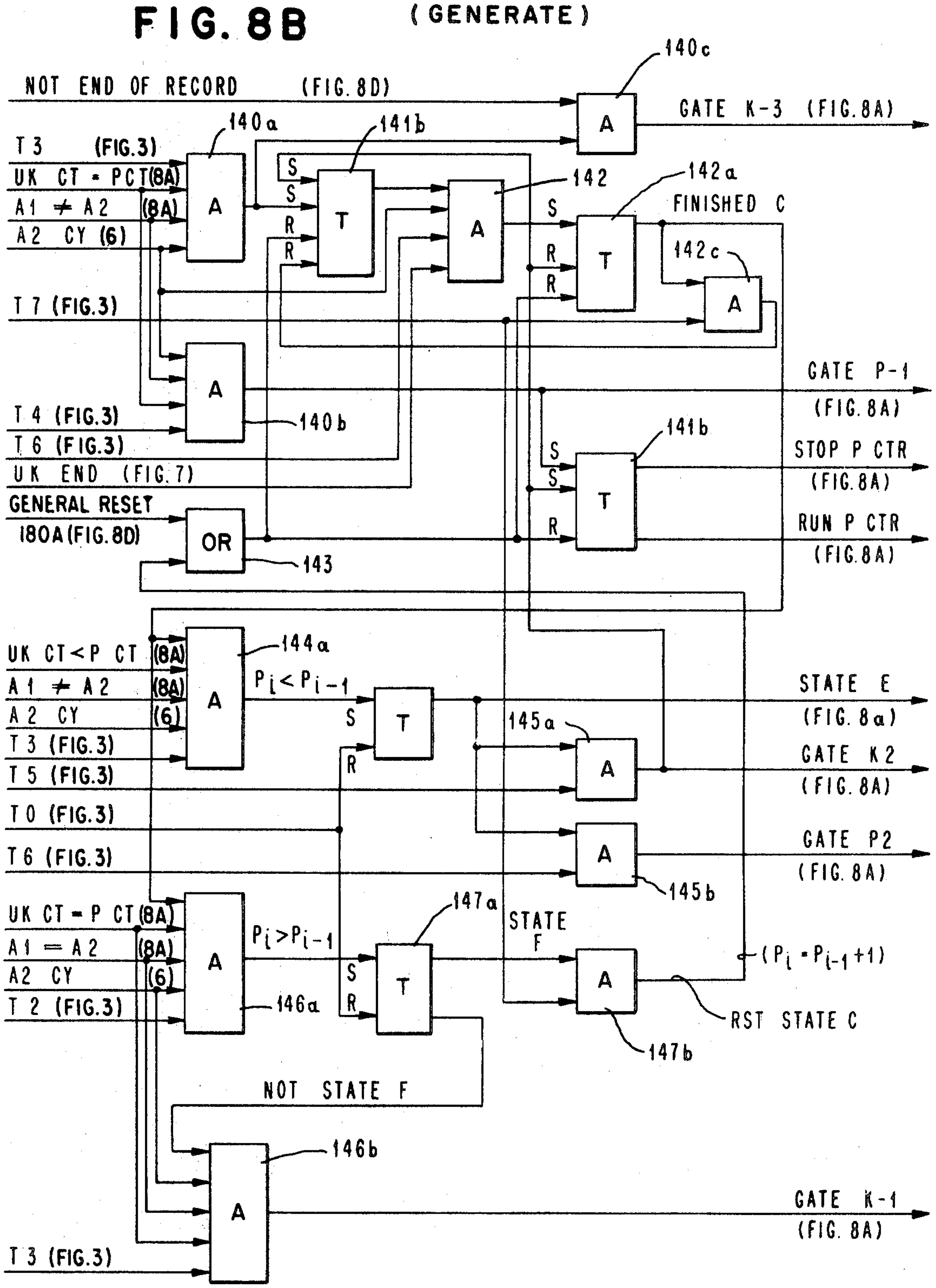

FIG. 8D (GENERATE)
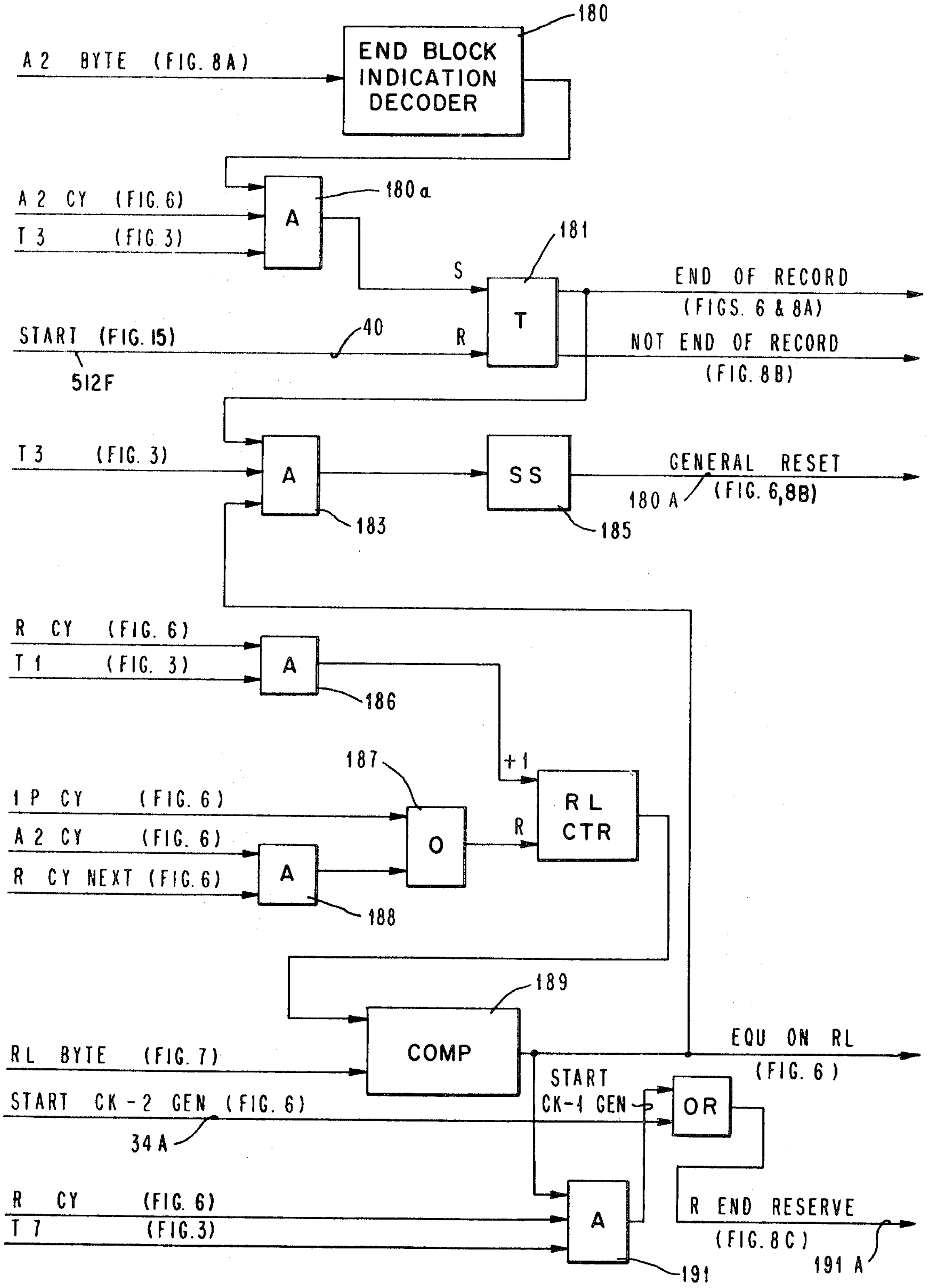

HIGH LEVEL GENERATION

LEVEL CONTROL TABLES

| L 1 | L 2 | | LK |
|---|---|---|---|
| MUKL – 1 | MUKL – 2 | | MUKL – K |
| LVL – L | LVL – H | | LVL – H |
| RL – 1 | RL – 2 | | RLK |
| RES. BYTE | RES. BYTE | | RES. BYTE |
| BL. LTH 1 | UK 2 = 0 | | UK K = 0 |
| | R2 = 0 | | RK = 0 |
| | BL. LTH 2 | | BL. LTH K |

POINTER TABLES

| L1 | L2 | L3 | | LK |
|---|---|---|---|---|
| R 1 – 1 | R 2 – 1 | R 3 – 1 | | RK – 1 |
| ⋮ | ⋮ | ⋮ | | ⋮ |
| R 1 – n | R2 – n | R3 – n | | RK – n |

(*) NOTE: USED IN RELATED APPLICATION NO 836825

( LOADING OF LO. ST. FROM I/O, AND GENERATION OF HIGH UK INDEX IN HI. ST.)

(FINAL STORING OF COMPRESSED BLOCK FROM LO.ST.; AND INTERMEDIATE STORING OF HI. ST. BLOCK)

MULTILEVEL COMPRESSED INDEX GENERATION METHOD AND MEANS

This invention relates generally to information retrieval and particularly to a new electronically controlled technique for generating multilevel machine-readable indexes. Basic methods and means for machine generation and machine searching of compressed indexes on a single level are disclosed and claimed in U.S. Pat. applications Ser. No. 788,807, 788,835 and 788,876 filed on Jan. 3, 1969, and owned by the same assignee as the subject application.

Information of every sort is being generated at an ever increasing rate. It is becoming ever more apparent that a bottleneck often exists in not being able to quickly retrieve an item of information from the mass of information in which it is buried. Although much work has been done on information retrieval, no overall solution has been found thus far, even though many sophisticated information retrieval techniques have been conceived for accessing of information involving large numbers of documents or records.

Within the information retrieval environment, the invention relates to a tool useful in controlling a machine to locate information indexed by keys. Any type of alphanumeric keys arranged in sorted sequence can be converted into compressed-key form and searched by the subject invention. Each compressed key represents a boundary (either high or low) for the uncompressed key it represents. Each compressed key may have associated with it data, or the location of one or more items of information it represents. The location information may be an attached address, pointer, or it may be derivable from the key itself by means not part of this invention.

The subject invention is inclusive of an inventive algorithm which provides compressed keys within a multilevel index to enable a large increase in the speed of searching the index compared to searching the index in uncompressed form.

Methods and means for searching an uncompressed multilevel index are known and have been disclosed in the past. Uncompressed index searching is being electronically performed with computer systems, using special access methods, control means, and electronic cataloging techniques. U.S. Pats. Nos. 3,408,631 to J. R. Evans et al., 3,315,233 to R. DeCampo et al., 3,366,928 to R. Rice et al.; 3,242,470 to Hagelbarger et al.; and 3,030,609 to Albrecht are examples of the state of the art.

Current computer information retrieval is limited in a number of ways, among which is the very large amount of storage required. The uncompressed key format in multilevel index form results in having to scan a large number of bytes in every key entry while looking for a search argument. This is time consuming and costly when searching a large index, or when repeatedly searching a small index. It is this area which is attacked by the subject invention, which greatly reduces the number of scanned bytes per key entry in a searched index. A result obtained is smaller search-storage requirements and faster searching due to less bytes needing to be machine sensed. A significant increase in searching speed results without changing the speed of a computer system.

Current electronic computer search techniques, such as in the above cited patents, have uncompressed keys accompanying records on a disk or drum for indexing the subject matter contained in an associated record. A search for the associated record may be done either by the key or by the address of the record. For example in U.S. Pat. Nos. 3,408,631; 3,350,693; 3,343,134; 3,344,402; 3,344,403 and 3,344,405 an uncompressed key can be indexed on a magnetically recorded disk. A key in a multilevel environment can be electronically scanned by a search argument for a compare-equal condition. Upon having a compare-equal condition, a pointer address associated with the respective uncompressed key is obtained and used to retrieve the record at a lower level represented by the key which may be elsewhere on the same device or on a different device. This pointer, for example, may include the location on the disk device, or on another device, where the next lower level record is recorded. The lowest index level locates the data record being sought, and the record may then be retrieved and used for any required purpose.

DEFINITION TABLE

A BYTE: Any single byte in the search argument which is currently being searched for in the compressed index. The position of the current A-byte in the search argument is indicated by the current setting of the equal counter.

APEX LEVEL: The highest level in the index. It usually comprises only a single block.

BINARY SEARCH: A search in which a set of sorted items is divided into two parts, where one part is rejected, and the process is repeated on the accepted part until the item with the desired property is found. (The binary search is a well-known computer programming technique for finding an argument in a sorted table.)

Block: A collection of recorded information which is machine accessible as a unit. A block is also called a RECORD. The meaning of block and record ordinarily found in the computer arts is applicable.

BOUNDARY PAIR: A pair of uncompressed keys which include the last uncompressed key used in the generation of a low-level compressed index block, and the first uncompressed key used in the generation of the next logically sequential low-level compressed index block.

COMPRESSED BLOCK: An index block comprising compressed index entries. It is also called a COMPRESSED INDEX BLOCK. It is a LOW-LEVEL COMPRESSED BLOCK if it is part of a low index level. It is a HIGH-LEVEL COMPRESSED BLOCK if it is part of a high index level.

COMPRESSED INDEX: An index of keys which are compressed by the method described in prior application number 788,807 or 788,876.

COMPRESSED INDEX ENTRY: An index entry having at least one compressed key and a related pointer. A HIGH-LEVEL INDEX ENTRY includes two compressed keys and a pointer. A LOW-LEVEL INDEX ENTRY includes one compressed key and a pointer.

COMPRESSED KEY: A reduced form of key which is most situations contains substantially fewer number of characters, or bits, than the original key it represents. It is generated by the method described in prior application number 788,807 or 788,876. It is generally referenced by its acronym CK. A CK is sometimes referred to by its format, PK, in which P is a position byte, and K is one or more key byte(s).

COMPRESSED KEY FORMAT: The PK form of a compressed key, generated by the method described in prior application 788,876, in which P is a position byte, and K is one or more key bytes. The LOW-LEVEL COMPRESSED ENTRY FORMAT is CK,R (equivalent to PK,R) in which R is a related pointer, and the HIGH-LEVEL COMPRESSED ENTRY FORMAT is CK,CK,R (which is equivalent to PK,PK,R).

DATA BLOCK: Data grouped into a single machine-accessible entity. A data block is also called a DATA LEVEL BLOCK.

DATA LEVEL: The collection of data, which may be called a data base, which is retrievable through the index. The data level comprises one or more data blocks. 3, 6

EQUAL COUNTER: A counter or register which indicates the current number of consecutive high-order bytes of the search argument found during the search of a compressed index. The equal counter setting is initialized before searching an index block to indicate the highest order byte position in the search argument. The equal counter is incremented each time a selected K-byte is equal to the current A-byte.

HIGH INDEX LEVEL: A grouping of index block's having entries with pointers that address index block's in a lower index level; that is, the pointers in a high level do not address data blocks. Every index level, except the lowest level, is a high index level.

HIGH LEVEL BLOCK: An index block in any high index level. Compressed or uncompressed keys may be included in the block.

INDEX: A recorded compilation of keys with associated pointers for locating information in a machine-readable file, data set, or data base. The keys and pointers are accessible to and readable by a computer system. The purpose of the index is to aid the retrieval of required data blocks.

INDEX BLOCK: A sequence of index entries which are grouped into a single machine-accessible entity.

INDEX ENTRY: An element of an index block having a single pointer. The entry may contain compressed or uncompressed key(s).

INDEX LEVEL: A set of entries in an index or compressed index which have pointers which address another level of the index.

KEY: A group of characters, or bits, usually forming a field in a data item, utilized in the identification or location of the item. The key may be part of a record or file, by which it is identified, controlled or sorted. The ordinary meaning in the computer arts is applicable.

KEY BYTE: A selected character in a key. It is called a K-byte in a compressed key.

LOWEST LEVEL: All index blocks which have entries with pointers that address data blocks. The lowest level is also called the LOW LEVEL. The "lowest level" or "low level" are distinguished from "lower level" which is a relative term that can apply to any index level except its highest level.

MULTILEVEL INDEX: An index with a lowest level and one or more high levels.

SEARCH ARGUMENT: A known reference word, or argument, used to search for a desired data block in a data base. The desired data block is expected to have a key field identical to the search argument. The acronym SA is used to reference the search argument. Each byte of the search argument is called an A-byte. For example, an employee's name may be an SA for searching for his record in a company file indexed by employee names.

POINTER: An address which locates a related block in a next lower level.

UNCOMPRESSED INDEX: An index as previously defined in which its key's are uncompressed key's.

UNCOMPRESSED KEY: It has the same meaning as KEY. (The reason for adding the descriptor "uncompressed" in this specification is to distinguish the ordinary key, which has an uncompressed form, from its reduced form, which is called herein by the term, compressed key). It is generally referred to by its acronym UK. .

This invention pertains to generating a compressed multilevel index. The compression removes a type of redundancy attributable to the sorted nature of the index, i.e., it removes a sorting induced type of redundancy, and only retains the minimum information needed for searching. The correct generation of a compressed multilevel index involves subtilties and criticalities that are not apparent from uncompressed multilevel indexes. Recognition of these unobvious characteristics is essential in order for the index to correctly fetch a required record in the next lower level of the index before the correct data record can be fetched.

It is therefore an object of this invention to provide a novel method and system which can generate a multilevel index compressed by removal of sorting redundancy and yet be able to fetch the correct next lower level index record.

It is another object of this invention to provide a novel method and system to generate a multilevel compressed index to reduce the number of searchable index bytes needed to be stored, when compared to a corresponding uncompressed multilevel index. This greatly increases the machine search speed in relation to the speed of searching the sorted uncompressed source index at the same machine byte rate.

It is a further object of this invention to generate a compressed index in which the size of multilevel key entries is largely independent of the length of corresponding uncompressed keys. For example, a pointer to a lower level index is accompanied by a pair of compressed keys having only a few bytes which represent an uncompressed key which could have hundreds or thousands of bytes. The amount of index compression is primarily dependent on the "tightness" of the index, that is the amount of variation in the sorted relationship among the uncompressed keys in the index.

More specific objects of this invention are:

A. To generate a high-level index having a compressed block format which permits searching by any uncompressed search argument.

B. To generate a block format for a high-level compressed index which permits searching through all index levels by a search argument that is not in the original UK index from which the compressed index is constructed, and the search argument would fall between adjacent uncompressed keys represented: (1) within a single compressed index block, or (2) in two compressed index blocks.

C. To generate each multilevel compressed index block so that it is independent of every other compressed block. This independency will permit updating on a single block basis.

D. To generate a multilevel index in which any index block can be entered during a search with a search-equal counter set to zero.

E. To generate each high-level block with a format of CK,CK,R for each entry in which R is the pointer, and each CK is a compressed key. The low-index may use a single CK per pointer as its format.

F. To generate a multilevel compressed index which is searchable from its apex to find a data block in which:

1. only one compressed block is accessed per index level, and
2. the correct data block is found if it was in the original index from which the compressed index was derived, or
3. the search argument is not in the index, and the search indicates a place in the index which is adjacent to where the search argument would have been placed if it had been in the original index.

G. To generate a multilevel index which provides an alternative entry into the compressed index at the beginning of any level lower than the apex.

H. To generate a multilevel index in which a complete search for a search argument can be made by entering the index at the beginning of any level and proceeding in a serial manner through that level until a correct high key is found, after which only a single block per level may be accessed.

The invention generates each block with a pair of compressed keys per pointer at index levels above the low level. The pair of compressed keys per pointer are generated from the pair of Uncompressed Keys (UK's) on opposite sides of the boundary represented between adjacent compressed blocks at the lowest index level.

All UK end-of-block boundaries are used for generation of the second index level (L2), which is the lowest of the high index levels. For each higher level, the last pair of UK's in any high level are used to generate a compressed index entry in the next higher index level. Generally, the highest (apex) level is the level for which only a single compressed index block is generated.

In this invention, the terminology "block" and "record" mean the same thing. The blocks in the embodiments can be either physically separated, or they can be different logical blocks in the same physical block.

This invention distinguishes between the generation of the lowest level of a multilevel index, and the generation of its levels higher than the lowest. The term "low level" will of 1,500,625 data blocks with five machine accesses which can be done in less than one second using seven different direct access devices (DASD), each having an average access time of less than 200 milliseconds which is available with current direct access device technology.

In the special case where every index block has C number of keys, and $j$ number of index level are used, the maximum number of accommodated L0 blocks is $C^j$.

Some examples using four index levels ($j$=4) are:

1. Using 100 pointers per block: 1,010,101 index blocks over the four levels can index a maximum of 100 million data blocks at level L0.
2. Using 1,000 pointers per block 1,001,001,001 index blocks over the four levels can index a maximum of 1 trillion data blocks at level L0.

In both examples (1) and (2), five block accesses are required to fetch any L0 data block by starting a search with the highest level block. If CK's are used instead of UK's in each index block, the number of index blocks is reduced when using blocks of the same byte length, or the byte length of the index blocks is reduced when using the same number of index blocks. Thus for one tenth compression using CK's example (1) could either ($a$) reduce by one tenth the number of index blocks having the same byte length for a total of 101,011 index blocks, or ($b$) reduce by one tenth the byte length for each of the 1,010,101 blocks. A like compression in example (2) could either ($a$) use the same byte length to reduce the total number of index blocks to 100,100,101, or ($b$) reduce by one-tenth the byte length of each of the 1,001,001,001 index blocks.

The following TABLE A illustrates a "Multilevel Uncompressed Index" having four index levels L1–L4 of blocks from which the "Multilevel Compressed Index" in the following TABLES B and C is generated:

TABLE A

MULTILEVEL UNCOMPRESSED INDEX

| L1 | | | L2 | | | L3 | | | L4 | | |
|---|---|---|---|---|---|---|---|---|---|---|---|
| BL. | UKs | PTRs | BL. | UKs | PTRs | BL. | UKs | PTRs | BL. | UKs | PTRs |
| 1-1 | $A_1$ | $R_{A1}$ | 2-1 | $A_n$ | $R_{1-1}$ | 3-1 | $C_n$ | $R_{2-1}$ | 4-1 | $I_n$ | $R_{3-1}$ |
| | . | . | | $B_1$ | | | $D_1$ | | | $J_1$ | |
| | $A_n$ | $R_{An}$ | | | | | | | | | |
| 1-2 | $B_1$ | $R_{B1}$ | | $B_n$ | $R_{1-2}$ | | $F_n$ | $R_{2-2}$ | | $R_n$ | $R_{3-2}$ |
| | . | . | | $C_1$ | | | $G_1$ | | | $S_1$ | |
| | $B_n$ | $R_{Bn}$ | | | | | | | | | |
| 1-3 | $C_1$ | $R_{C1}$ | | $C_n$ | $R_{1-3}$ | | $I_n$ | $R_{2-3}$ | | $@_n$ | $R_{3-3}$ |
| | . | . | | $D_1$ | | | $J_1$ | | | END | |
| | $C_n$ | $R_{Cn}$ | | ----/---- | | | ---//---- | | | ---///--- End of L4 Index | |
| 1-4 | $D_1$ | $R_{D1}$ | 2-2 | $D_n$ | $R_{1-4}$ | 3-2 | $L_n$ | $R_{2-4}$ | | | |
| | . | . | | $E_1$ | | | $M_1$ | | | | |
| | $D_n$ | $R_{Dn}$ | | | | | | | | | |
| 1-5 | $E_1$ | $R_{E1}$ | | $E_n$ | $R_{1-5}$ | | $O_n$ | $R_{2-5}$ | | | |
| | . | . | | $F_1$ | | | $P_1$ | | | | |
| | $E_n$ | $R_{En}$ | | | | | | | | | |
| 1-6 | $F_1$ | $R_{F1}$ | | $F_n$ | $R_{1-6}$ | | $R_n$ | $R_{2-6}$ | | | |
| | . | . | | $G_1$ | | | $S_1$ | | | | |
| | $F_n$ | $R_{Fn}$ | | ----/---- | | | ----//---- | | | | |
| 1-7 | $G_1$ | $R_{G1}$ | 2-3 | $G_n$ | $R_{1-7}$ | 3-3 | $U_n$ | $R_{2-7}$ | | | |
| | . | . | | $H_1$ | | | $V_1$ | | | | |
| | $G_n$ | $R_{Gn}$ | | | | | | | | | |
| 1-8 | $H_1$ | $R_{H1}$ | | $H_n$ | $R_{1-8}$ | | $X_n$ | $R_{2-8}$ | | | |
| | . | . | | $I_1$ | | | $Y_1$ | | | | |
| | $H_n$ | $R_{Hn}$ | | | | | | | | | |

TABLE A (Cont.)

MULTILEVEL UNCOMPRESSED INDEX

| L1 | | | L2 | | | L3 | | | L4 | | |
|---|---|---|---|---|---|---|---|---|---|---|---|
| BL. | UKs | PTRs | BL. | UKs | PTRs | BL. | UKs | PTRs | BL. | UKs | PTRs |
| 1-9 | $I_1$ | $R_{I1}$ | | $I_n$ | $R_{1-9}$ | | $@_n$ | $R_{2-9}$ | | | |
| | . | . | | $J_1$ | | | END | | | | |
| | $I_n$ | $R_{In}$ | | ----/---- | | | ---//---- End of L3 Index | | | | |
| 1-10 | $J_1$ | $R_{J1}$ | 2-4 | $J_n$ | $R_{1-10}$ | | | | | | |
| | . | . | | $K_1$ | | | | | | | |
| | $J_n$ | $R_{Jn}$ | | | | | | | | | |
| 1-11 | $K_1$ | $R_{K1}$ | | $K_n$ | $R_{1-11}$ | | | | | | |
| | . | . | | $L_1$ | | | | | | | |
| | $K_n$ | $R_{Kn}$ | | | | | | | | | |
| 1-12 | $L_1$ | $R_{L1}$ | | $L_n$ | $R_{1-12}$ | | | | | | |
| | . | . | | $M_1$ | | | | | | | |
| | $L_n$ | $R_{Ln}$ | | -----/----- | | | | | | | |
| 1-13 | $M_1$ | $R_{M1}$ | 2-5 | $M_n$ | $R_{1-13}$ | | | | | | |
| | . | . | | $N_1$ | | | | | | | |
| | $M_n$ | $R_{Mn}$ | | | | | | | | | |
| 1-14 | $N_1$ | $R_{N1}$ | | $N_n$ | $R_{1-14}$ | | | | | | |
| | . | . | | $O_1$ | | | | | | | |
| | $N_n$ | $R_{Nn}$ | | | | | | | | | |
| 1-15 | $O_1$ | $R_{O1}$ | | $O_n$ | $R_{1-15}$ | | | | | | |
| | . | . | | $P_1$ | | | | | | | |
| | $O_n$ | $R_{On}$ | | ----/----- | | | | | | | |
| 1-16 | $P_1$ | $R_{P1}$ | 2-6 | $P_n$ | $R_{1-16}$ | | | | | | |
| | . | . | | $Q_1$ | | | | | | | |
| | $P_n$ | $R_{Pn}$ | | | | | | | | | |
| 1-17 | $Q_1$ | $R_{Q1}$ | | $Q_n$ | $R_{1-17}$ | | | | | | |
| | . | . | | $R_1$ | | | | | | | |
| | $Q_n$ | $R_{Qn}$ | | | | | | | | | |
| 1-18 | $R_1$ | $R_{R1}$ | | $R_n$ | $R_{1-18}$ | | | | | | |
| | . | . | | $S_1$ | | | | | | | |
| | $R_n$ | $R_{Rn}$ | | ----//---- | | | | | | | |
| 1-19 | $S_1$ | $R_{S1}$ | 2-7 | $S_n$ | $R_{1-19}$ | | | | | | |
| | . | . | | $T_1$ | | | | | | | |
| | $S_n$ | $R_{Sn}$ | | | | | | | | | |
| 1-20 | $T_1$ | $R_{T1}$ | | $T_n$ | $R_{1-20}$ | | | | | | |
| | . | . | | $U_1$ | | | | | | | |
| | $T_n$ | $R_{Tn}$ | | | | | | | | | |
| 1-21 | $U_1$ | $R_{U1}$ | | $U_n$ | $R_{1-21}$ | | | | | | |
| | . | . | | $V_1$ | | | | | | | |
| | $U_n$ | $R_{Un}$ | | -----/----- | | | | | | | |
| 1-22 | $V_1$ | $R_{V1}$ | 2-8 | $V_n$ | $R_{1-22}$ | | | | | | |
| | . | . | | $W_1$ | | | | | | | |
| | $V_n$ | $R_{Vn}$ | | | | | | | | | |
| 1-23 | $W_1$ | $R_{W1}$ | | $W_n$ | $R_{1-23}$ | | | | | | |
| | . | . | | $X_1$ | | | | | | | |
| | $W_n$ | $R_{Wn}$ | | | | | | | | | |
| 1-24 | $X_1$ | $R_{X1}$ | | $X_n$ | $R_{1-24}$ | | | | | | |
| | . | . | | $Y_1$ | | | | | | | |
| | $X_n$ | $R_{Xn}$ | | -----/----- | | | | | | | |
| 1-25 | $Y_1$ | $R_{Y1}$ | 2-9 | $Y_n$ | $R_{1-25}$ | | | | | | |
| | . | . | | $Z_1$ | | | | | | | |
| | $Y_n$ | $R_{Yn}$ | | | | | | | | | |
| 1-26 | $Z_1$ | $R_{Z1}$ | | $Z_n$ | $R_{1-26}$ | | | | | | |
| | . | . | | $@_1$ | | | | | | | |
| | $Z_n$ | $R_{Zn}$ | | | | | | | | | |
| 1-27 | $@_1$ | $R_{@1}$ | | $@_n$ | $R_{1-27}$ | | | | | | |
| | . | . | | END | | | | | | | |
| | $@_n$ | $R_{@n}$ | | ----/------ | | | | | | | |
| | End of L1 Index | | | End of L2 Index | | | | | | | |

hereafter refer to the lowest level of the multilevel index, and the term "high level" will hereafter refer to any level above the "low level."

With this invention, high-level index blocks have a different format than low-level index blocks. The high-level format associates a pair of compressed keys (CK's) with a single pointer, which addresses a next lower level block; while the low-level format associates a single CK with each pointer, which addresses a data level block. In the high-level format, the first CK of any pair indicates the index change within the block referenced by the associated pointer, and the second CK of the pair indicates the index change between the end of the block referenced by the associated pointer and the beginning of the following block in the index sequence.

The foregoing and other objects, features and advantages of the invention will be apparent from the following more particular description of preferred embodiments of the invention, as illustrating in the accompanying drawings:

FIG. 3 shows a clocking and mode control arrangement;

FIGS. 4A illustrates generation mode clock timing for the circuit in FIG. 6, and FIG. 4B shows search mode clock timing;

FIG. 5A illustrates a format for a low-level compressed index block; while FIG. 5B illustrates a format for a high-level compressed index block;

FIG. 6 represents generation mode clock controls;

FIGS. 8A, 8B, 8C and 8D represent circuitry controlling the generation of compressed keys;

FIGS. 12A, 12B, 12C, 12D and 12E generally illustrate the inputting of a lowest level (L1) Uncompressed Key (UK) index, and generating therefrom the UK index for the next higher index level, while simultaneously generating the Compressed Key (CK) index at the L1 level.

FIGS. 13A, 13B, 13C, 13D and 13E generally illustrate an inputting of a high level (L2) UK index and generating therefrom the UK index for the next higher index level (L3) while simultaneously generating CK blocks at the L2 input level.

Figures 14A, 14B, 14C:
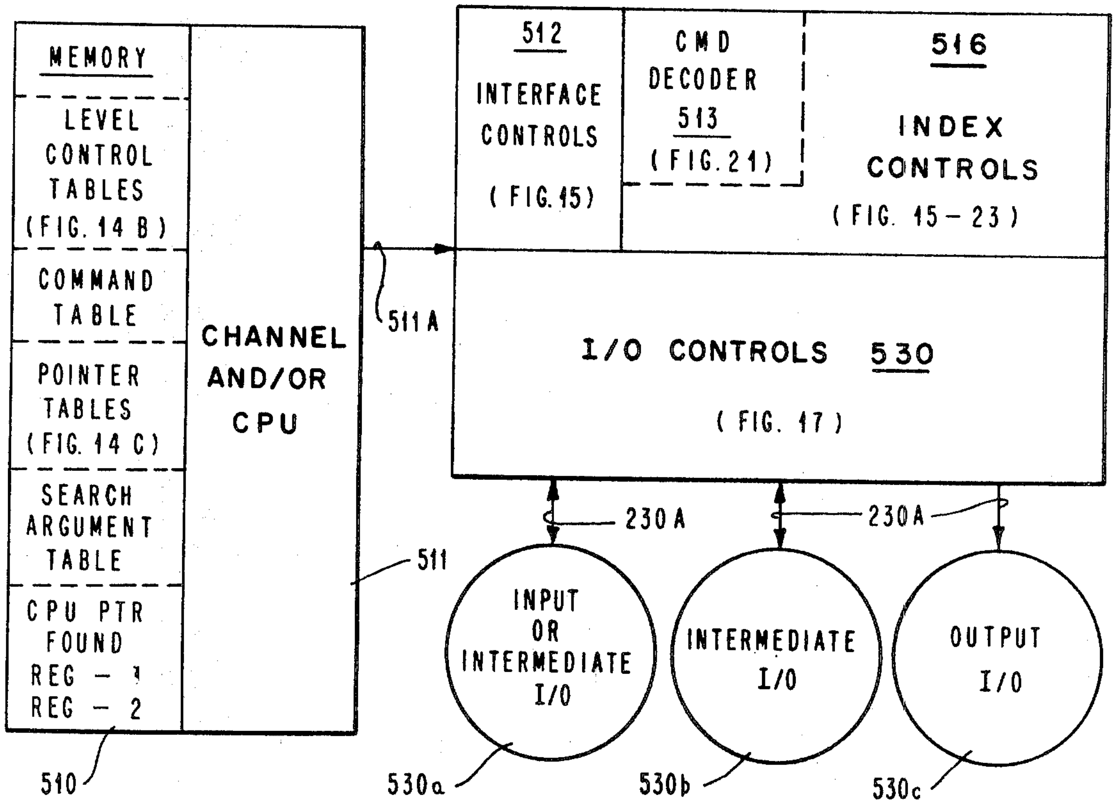

FIGS. 14A, 14B illustrate an overview of a computer system which contains the invention;

FIGS 15, 16, 17, 18, 19, 20, 21, 22 and 23 provide an embodiment of a multilevel index generation control system and FIGS. 24A, 24B, 24C, 24D and 24E provide a specific method embodiment of the invention, which has steps that correlate with functions performed by the embodiment represented in FIGS. 15, 16, 17, 18, 19, 20, 21, 22 and 23.

Figure 9:
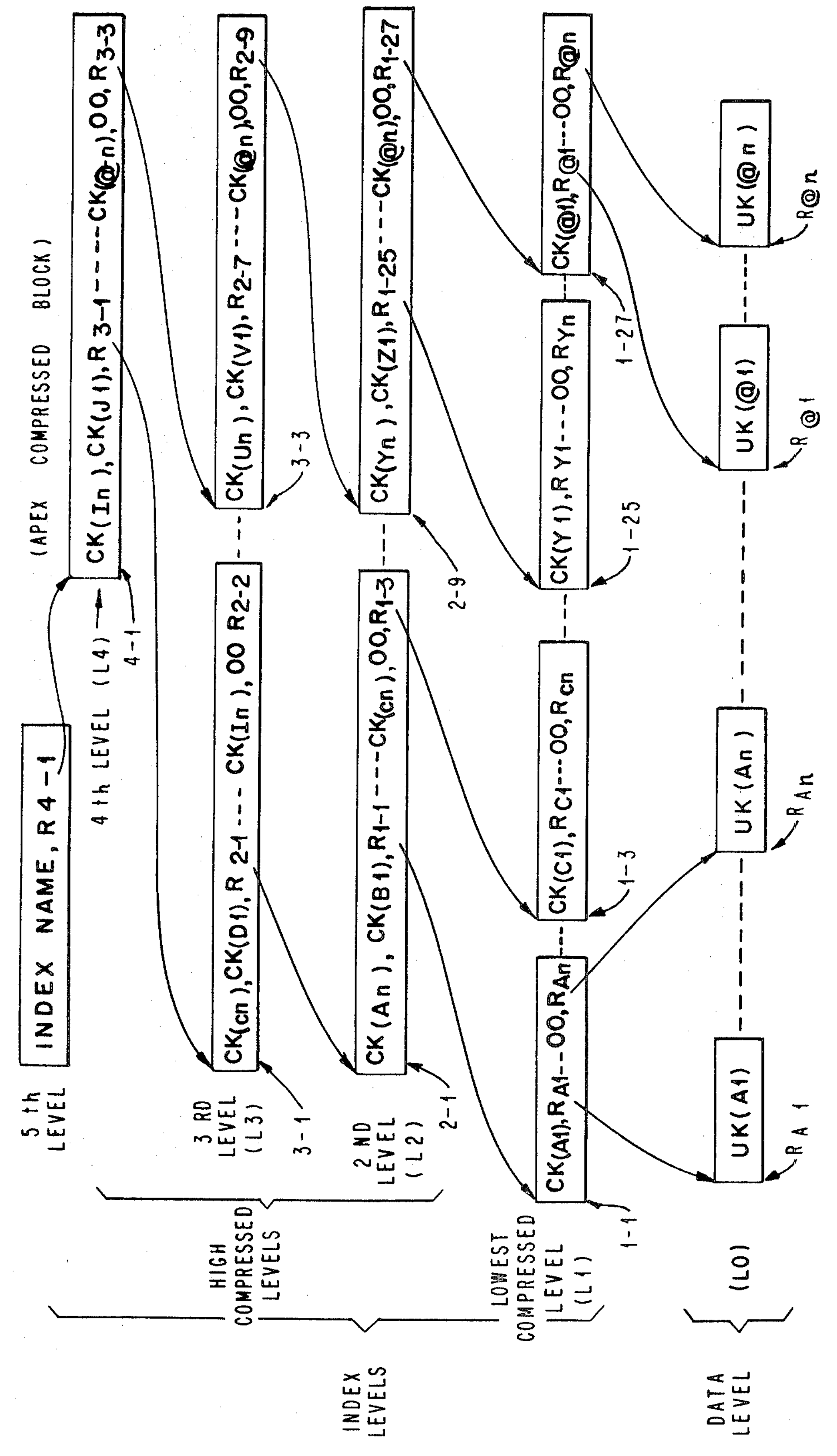
FIG. 9 represents a multilevel compressed index block structure generated according to this invention.

The result of the invention is represented in FIG. 9 by compressed index levels L1 through L4. They are used to retrieve information from data level (L0). The multilevel index includes a compressed low-level index L1, and compressed high-level indexes L2, L3, and L4. A fifth level is not compressed and may be an entry in a conventional computer system catalogue; the entry comprises the name of the L0 data base, and an address (pointer) $R_{411}$ which locates the level L4 Apex compressed index block $4_1 1$.

The data level L0 comprises a large plurality of blocks of data, each being indexed by its Uncompressed Key (UK), which includes a first information block having key UK($A_1$) through a last block having key UK($@_n$). The choice of the key for each block is not part of this invention, and it can be the conventional practice of taking any field in a block which is used to index the block. For example, the key may be a field in the block representing an inventory item, man numbers, department number, book, auto license number, etc. with other portions in the block representing information indexed by the key. The blocks at data level L0 may be randomly located where ever there is space on a randomly accessible storage device, such as for example on a magnetic disk drive, a magnetic drum, or strip file device. There is no requirement that the blocks in levels L0–L5 have any rigid positional relationship, sequential or otherwise. Each may be located at any place where space is available on the device, as long as the block addresses in the available space is provided as an input to this invention. The primary requirement for fast retrieval is that the device be able to quickly access any block when given its respective address.

The blocks in FIG. 9 at level L0 are shown in the order of the sorted sequence of their uncompressed keys, UK ($A_1$) through UK ($@_n$). This sorted representation is included in the organization of the invention's multilevel indexing structure. However this sorted relationship has no positional relationship to the locations of the data or index blocks on the one or more randomly accessible devices in which the blocks are stored. A desirable consequence of this random-position-indexing organization is that it is no longer necessary to move an unchanged block whenever new blocks are added anywhere in its sorting sequence.

It is preferable, although not mandatory, that the highest level have only a single block.

A search for any L0 block using this indexing structure only requires that accessing of one block per indexing level at computer speed, regardless of the number of blocks at any level. Hence in FIG. 9, any required L0 block may be directly retrieved as the sixth block access after five indexing block accesses from level L5 downwardly through levels L4, L3, L2, L1, and L0. The six accesses are not affected by the number of blocks at any of these levels, including data level L0.

The beginning of each index block is located at an address, called a pointer R having two subscript numbers. The first subscript represents the level of the addressed block, and the second subscript represents the sorted position of the addressed block in its particular level. The pointers $R_{311}$ through $R_{313}$ within level L4 locate the respective blocks 3–1 through 3—3 in level L3. Similarly each of pointers $R_{211}$ through $R_{219}$ in L3 locates a respective block 2—1 through 2–9 in L2. Likewise the respective pointers $R_{111}$ through $R_{1127}$ in L2 locate the respective blocks 1—1 through 1–27 within L1. Finally each pointer $R_{A1}$ through $R_{@n}$ locates a respective block in the data level L0.

At level L1, each Compressed Key has a pointer appended to it, such as the first CK ($A_1$) having appended pointer $R_{A1}$ for locating the first L0 block; and each block in level L1 is generated by the compressed index method and means disclosed and claimed in (1) U.S. Pat. application Ser. No. 788,876 filed Jan. 3, 1969 by E. Loizides and J. R. Lyon having the title "Compressed Index Method and Means With Single Control Field," or (2) U.S. Pat. application Ser. No. 788,807 filed Jan. 3, 1969 by W. A. Clark IV, K. A. Salmond and T. S. Stafford titled "Method and Means for Generating Compressed Keys," both applications being assigned to the same assignee as the subject application.

A very large L0 data base can be handled by the indexing structure in FIG. 9. Accordingly the index can handle a very large number of keys for searching among a corresponding number of blocks at level L0. For example the following TABLES B and C represent a compressed index which will accommodate 27,000 separate data blocks within level L0 if each L1 block includes 1,000 compressed keys (CK's), which is a practical number. TABLE A represents the uncompressed index corresponding to the compressed index in TABLES B and C. In another example, if every index block in levels L1–L4 in FIG. 9 is assumed to have 35 pointers per block the four index levels will index up to 1,500,625 data blocks at level L0. Hence it becomes possible to randomly retrieve any

TABLE B

MULTILEVEL COMPRESSED INDEX

| L1 | | | L2 | | |
|---|---|---|---|---|---|
| BL. | CKs | PTRs | BL. | CKs | PTRs |
| 1-1 | CK($A_1$), | $R_{A1}$ | 2-1 | CK($A_n$), CK($B_1$), | $R_{1-1}$ |
| | ⋮ | ⋮ | | CK($B_n$), CK($C_1$), | $R_{1-2}$ |
| | 00 , | $R_{An}$ | | CK($C_n$), 00 , | $R_{1-3}$ |
| 1-2 | CK($B_1$), | $R_{B1}$ | | ⋮ | |
| | 00 , | $R_{Bn}$ | | | |
| 1-3 | CK($C_1$), | $R_{C1}$ | | | |
| | 00 , | $R_{Cn}$ | | | |
| | ⋮ | | | ⋮ | |
| 1-25 | CK($Y_1$), | $R_{Y1}$ | 2-9 | CK($Y_n$), CK($Z_1$), | $R_{1-25}$ |
| | 00 , | $R_{Yn}$ | | CK($Z_n$), CK($\theta_1$), | $R_{1-26}$ |
| | | | | CK($\theta_n$), 00 , | $R_{1-27}$ |
| 1-26 | CK($Z_1$), | $R_{Z1}$ | | | |
| | 00 , | $R_{Zn}$ | | | |
| 1-27 | CK($\theta_1$), | $R_{\theta 1}$ | | | |
| | 00 , | $R_{\theta n}$ | | | |

TABLE C

MULTILEVEL COMPRESSED INDEX

| L3 | | | L4 | | |
|---|---|---|---|---|---|
| BL. | CKs | PTRs | BL. | CKs | PTRs |
| 3-1 | CK($C_n$), CK($D_1$), | $R_{2-1}$ | 4-1 | CK($I_n$), CK($J_1$), | $R_{3-1}$ |
| | CK($F_n$), CK($G_1$), | $R_{2-2}$ | | CK($R_n$), CK($S_1$), | $R_{3-2}$ |
| | CK($I_n$), 00 , | $R_{2-3}$ | | CK($\theta_n$), 00 , | $R_{3-3}$ |
| | ⋮ | | | | |
| 3-3 | CK($U_n$), CK($V_1$), | $R_{2-7}$ | | | |
| | CK($X_n$), CK($Y_1$), | $R_{2-8}$ | | | |
| | CK($\theta_n$), 00 , | $R_{2-9}$ | | | |

TABLE A, column L1, illustrates the lowest index level L1 blocks of Uncompressed Keys (UK's) obtained from the key fields of the information blocks at data level L0. The level L0 information blocks need not be located in any particular order, and are assumed to have random locations. The keys are taken from any field within the L0 information blocks required for indexing. After the L0 block keys are obtained, they are sorted and blocked to generate the L1 UK block sequence, such as in column L1, by programming or hardware means known in the art and not part of this invention. Hence the UK's and their blocks are in sorted sequence in column L1, and they are stored in a form which can provide the input to the Generate Mode of this invention.

For example, they may be stored on a tape I/O device in a sequential manner, such as the 27 sequential blocks 1—1 through 1-27 in TABLE A, column L1. These UK blocks are respectively used by this invention to generate uncompressed key blocks 2—1 through 2-9 shown in column L2 of TABLE A. The UK blocks in column L2 are then used to generate the UK blocks in column L3, etc. until the highest level L4 is generated, which comprises a single UK block.

Accordingly each current level of UK blocks is used to generate the next higher level of UK blocks. Furthermore, while generating the next higher UK block level, the detailed embodiment herein also compresses the keys at current UK level.

The length of the Uk blocks at any level is determined by the size required for the blocks at that level. The boundary at the end of each block in TABLE A, in column L1, is represented by dashed lines (-----), and some dashed lines have one or more intersecting slash lines (/) to represent the significance of the boundary at higher levels. All level L2 block boundaries in TABLE A are identified by symbol ---/---, all L3 block boundaries by symbol --//--, and all L4 block boundary by symbol -///--. The use of these higher level boundaries as L1 boundaries indicates their level of significance.

The UK's on opposite sides of each end boundary are significant in the generation of the higher level compressed keys; they are called "boundary UK's." Hence each block-end boundary is represented by a pair of "boundary UK's."

The second level (L2) UK sequence represented in column L2 of TABLE A comprises all "boundary UK's" in the L1 block sequence.

The third level (L3) UK sequence represented in column L3 in TABLE A comprises the last pair of UK's in each UK block in the level L2 sequence. The last level (L4) in the example of TABLE A comprises the last pair of UK's in each UK block in the level L3 sequence.

Certain L1 "boundary UK's" are the last pair of UK's at the end of each block at all every higher level. Thus at level L1, every third boundary identifies a pair of "boundary UK's" used to end each block at level L2, every ninth L1 boundary defines "boundary UK's" used to end each block at level L3, and the last (27th) L1 boundary defines the boundary UK's used to end the highest level block at level L4. Thus the "-boundary UK's" ending the high-level block also ends the last block at every lower "high level" (above L1), and it also represents the last "boundary UK's" at low level L1.

The number of UK's in each high level (L2 and higher) is assumed to be six in the example of TABLE A. Each high level pair of UK's and a pointer generates two corresponding CK's with the same pointer found in TABLES B and C.

In practice, a large number of pointers, each with a pair of CK's, may be provided in any block. The size of the block is in practice determined by the user of the invention, and it will be dependent upon the type of storage that is available for the multilevel index, and the required speed of search.

The size of a compressed block is directly related to the speed of search, since any single block is searched sequentially from its beginning. Hence the shorter the block, the less the search time through a block. It is seldom necessary to search to the end of any given block, since the search ends as soon as the search argument is low with respect to any compressed key in a block. A good rule of thumb for determining average search time per block is the time required to scan one-half a block. The search technique may use the method and means described and claimed in the previously cited applications having Ser. No. 788,876, or 788,835.

The number of blocks sequentially scanned by a search argument generally is equal to the number of levels in the multilevel index. Thus the search speed is independent of the number of blocks in any given level. Other factors in determining the practical size of the multilevel blocks is the efficiency in utilization of storage space on particular I/O devices in which blocks may be stored, and their access time thereon.

Although equal size blocks are shown for all high levels in TABLE A, this is a special case. The block size in number of compressed keys per block may be represented by $C_1$, $C_2$......$C_j$ at respective levels 1, 2......$j$, where $j$ is the highest level. C/2 represents the number of pointers in a high-level index block, where high level is level 2 or higher. C/2 also is the number of next-lower-level blocks indexed by this same block. $C_1$ represents the number of pointers in an L1 block.

$K_1$, $K_2$.....$K_j$ represent the number of blocks at the respective subscript levels. The number K of blocks decreases exponentially as the level number increases. Hence the total number of blocks in an index is $K_1+K_2+.....+K_j$. This set of numbers decreases from $K_1$ to $K_j$. At the lowest level L1 only one CK per pointer is used, and $K_0=K_1 \times C_1$.

In the special case where the number of pointers (R) per block is equal for all index levels, and $K_j=1$, then $R=K_0/K_1=K_1/K_2=...=K_{j/11}$. This special case is represented in TABLE A. The total number of L0 data blocks handled by this special case is $R^J$.

TABLES B and C show the four levels of the "Multilevel Compressed Index" which is derived from the "Multilevel Uncompressed Index" shown in TABLE A. TABLES B and C have the same number of blocks as in TABLE A, but each block in TABLES B and C is much smaller because of the unique index compression. Accordingly, there is a one-for-one relationship between the respective blocks in the compressed and uncompressed indexes.

FIG. 14A provides an overview of the environment for an embodiment of the invention, which has its steps largely executed by index controls 516. It includes a Channel and/or CPU 511 which connects a memory 510 via transmission and control lines 511A to interface controls 512 and to I/O controls 530. I/O controls 530 connect to a plurality of I/O devices **530*a*, 530*b*, and 530*c*. Input I/O device 530*a* may be a tape unit having the input UK sequence represented by column L1 in TABLE A. Output I/O device 530*c* receives the generated multilevel compressed index. Intermediate I/O device 530*b*, as well as I/O 530*a*, and used for interim storage during operation of the invention; and both may be tape units, since each will be used in a serial manner. The output device 530*c*** preferably has fast random access capability on a per block basis, and it may be one or more magnetic disks, magnetic drums, or magnetic strip files.

Figure 10:
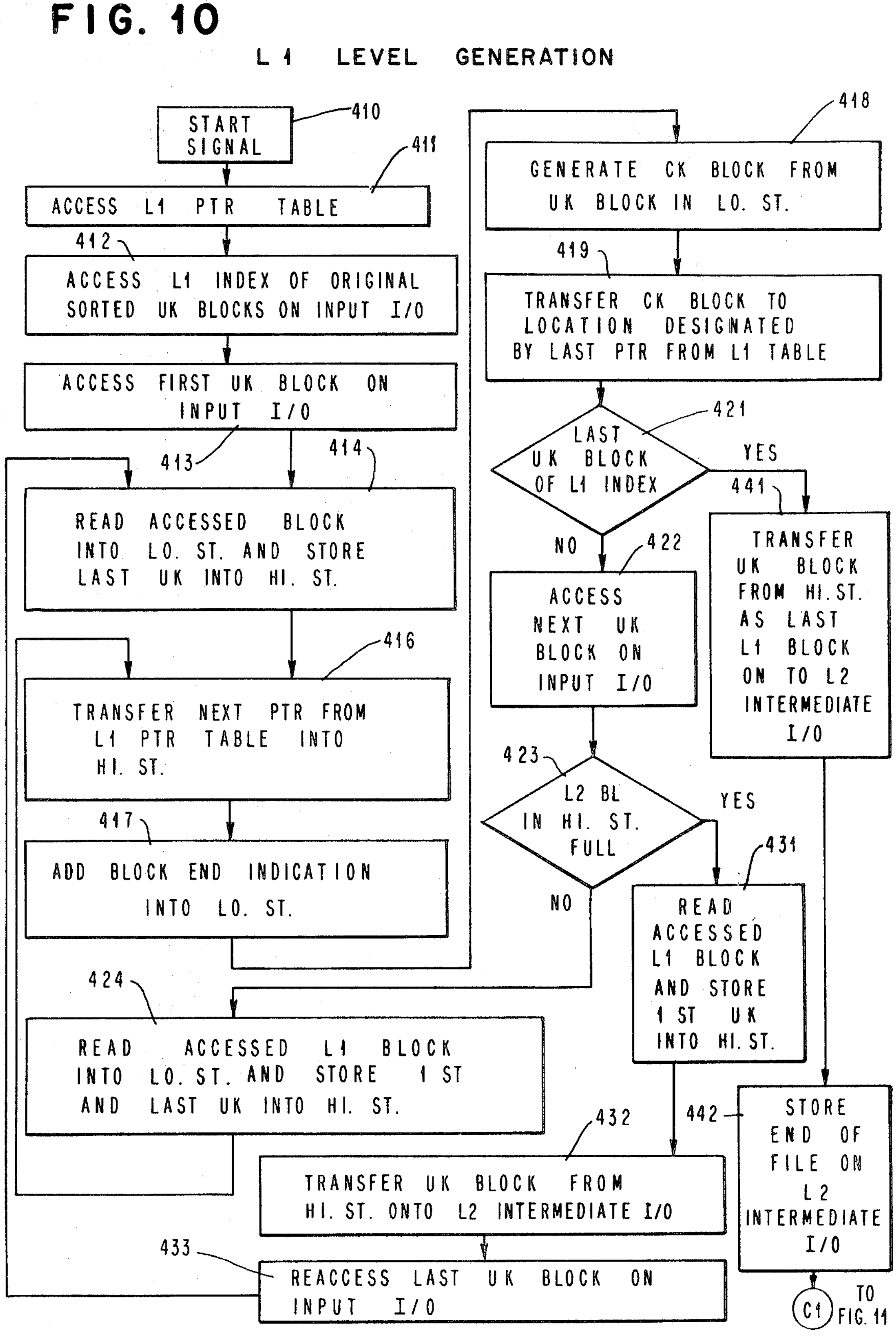
FIGS. 10 and 11 illustrate a generation method embodiment of this invention.
Figure 11:
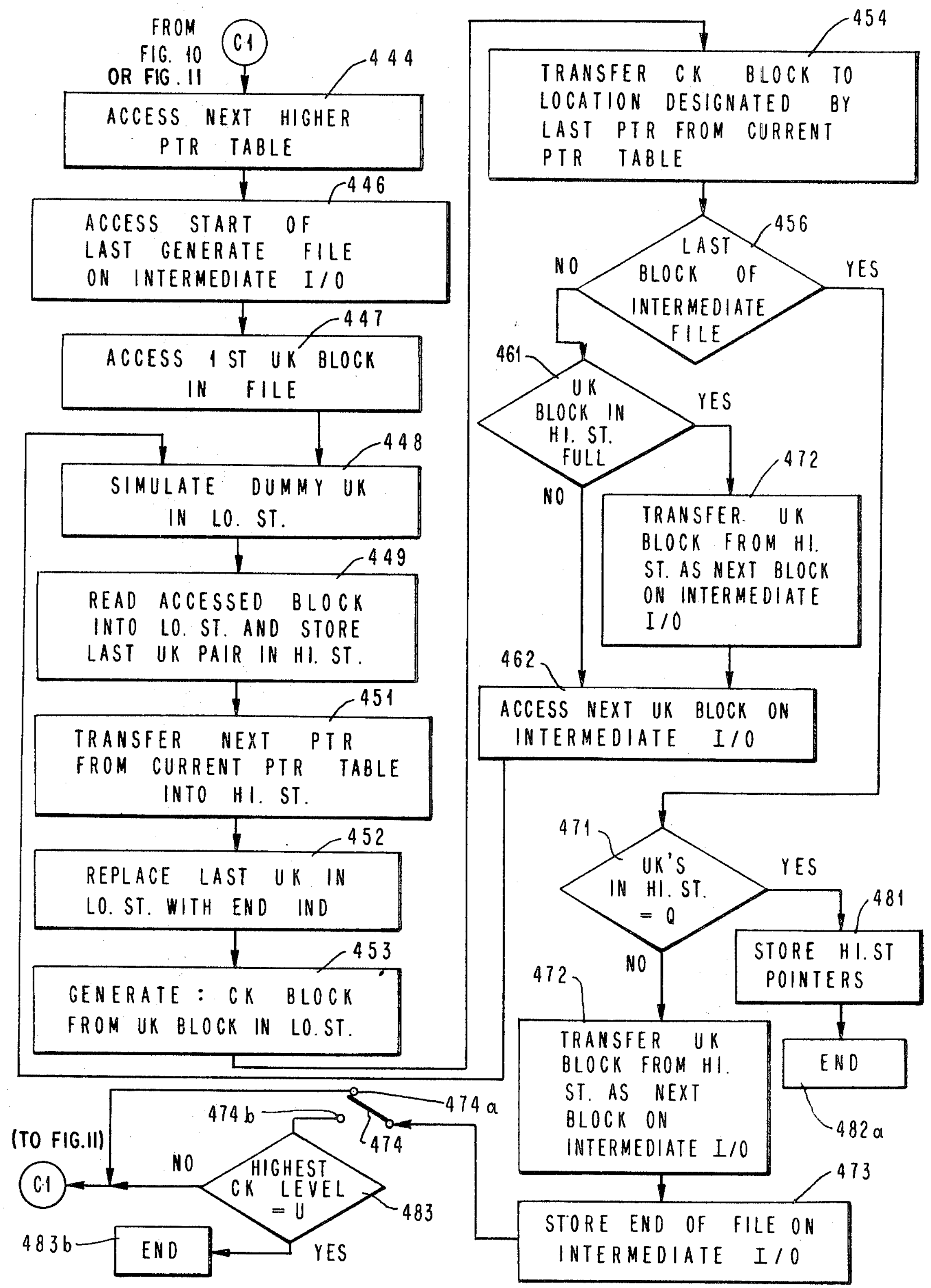

FIGS. 10 and 11 generally illustrate the multilevel generation method used in this invention.

FIGS. 12A, 12B, 12C, 12D and 12E assist the explanation of the method in FIG. 10; and FIGS. 13A, 13B, 13C, 13D and 13E assist the explanation of the method in FIG. 11.

Figures 1A, 1B:
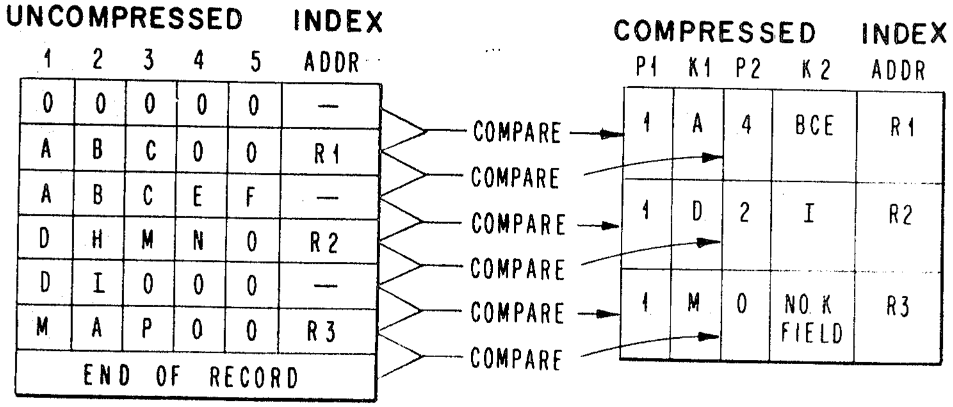
FIG. 1A illustrates an uncompressed high-level index.
FIG. 1B illustrates the compressed high-level index derived therefrom.

FIGS. 1A and 1B provide a specific example of the operation of the invention. FIG. 1A shows a sorted sequence of UK's and pointer's, which may be considered a single set of UK+s within a high level of an index. FIG. 1B illustrates the high-level index entries from the UK's in FIG. 1A, which may be considered an input to the generation process. The COMPARE's illustrated between FIGS. 1A and 1B relate the UK's in FIG. 1A to respective CK's in FIG. 1B.

In FIG. 1A, six UK areas (or word positions) are shown, each occupying a five byte filed in which the byte positions in each UK field are labeled 1, 2, 3, 4 and 5 from the highest order byte position 1 to the lowest order byte position 5. Alternate ADDR fields receive pointers R1, R2 and R3. The in-between ADDR fields have nothing, which is symbolized with a dash (1) and may be nonexistent in a byte string representing the information in FIG. 1A.

The first UK position at the top of FIG. 1A contains a null-key represented by five 0-bytes in its byte positions 1 through 5. The null UK is an initialization condition for beginning the CK generation operation. (The machine can be made to recognize an initial null condition without actually recording any null UK, i.e. by simulating the effect of such a dummy UK.) The pointer field with the null UK is not used.

The following five UK areas receive real UK's which are left justified at their highest order byte position, i.e. byte position 1 in FIG. 1A. Because of the fixed length areas (i.e. five bytes) provided for each UK in FIG. 1A, any unused byte positions at the right of a UK are padded with null bytes, shown as zeros.

The first two real UK's ABC and ABCEF respectively include the last UK used in the generation of a lowest-level index block at address $R_1$ and the first UK used in the generation of the next logically sequential lowest level index block at address $R_2$. The UK's ABC and ABCEF comprise a boundary pair of UK's with the related pointer R1.

The next boundary pair of UK's in FIGS. 1A are DHMN and DI which similarly represent the last UK for the block at address R2, and the first UK for the next logically sequential block at address R3. The block at address R3 is presumed in FIGS. 1A to be the last lowest level block to be represented in the resulting high-level index block in FIG. 1B. Accordingly the last two entries in FIG. 1A are the last UK for the index block at address R3 which is MAP, and an end-of-record representation.

In the discussion of this example, the three pointers R1, R2 and R3 are presumed to address three compressed index blocks in the lowest index level which were previously generated by the method in U.S. Pat. application Ser. No. 788,876 and were respectively recorded at storage locations identified by pointers R1, R2 and R3.

Thus in FIG. 1A, the pair of UK's on the same line as a pointer, and on the line following that pointer are a "boundary pair" of UK's. The UK on the same line as pointer R1 is the last UK of a group of UK's used to generate a low-level compressed index block addressed by pointer R1. The UK on the line after a pointer R1 is the first UK (ignoring the null UK) of a next sequential group of UK's used to generate a low-level compressed index block addressed by the next point R2. Thus three boundary pairs of UK's are shown in FIG. 1A.

In FIG. 1B, each compressed index entry is shown in a single horizontal line with the entry format $CK_1$, $CK_2$, R; in which $CK_1$ comprises a position byte P1 and key byte(s) k1, and $CK_2$ comprises a position byte P2 and the key bytes(s) K2. THat is $CK_1$ is P1, K1 and $CK_2$ is P2, K2. The address column in FIG. 1B has the same pointers found in the address column of FIG. 1A, i.e. R1, R2 and R3.

Thus the high-level entry format representation may be summarily stated as CK, CK, R which is identical to PK, PK, R.

The generation process for obtaining the compressed entries in FIG. 1B involves the comparing of adjacent UK's in FIG. 1A beginning with the first pair of UK's at the top of FIG. 1A, in which the null UK is the first UK and ABC is the second UK of the first compare. The pair of UK's is compared a byte position at a time beginning with its highest order byte position 1 in FIG. 1A. The comparison proceeds from left to right until an unequal byte comparison is found. Thus the operation begins by comparing bytes 0 and A in byte position 1. An unequal comparison immediately occurs at byte position 1 with the first pair of UK's, because of the first null byte in the first key. As a result at the top of FIG. 1B, the first compressed index entry has a 1 entered as a value into its position byte P1, and an A is entered into the K1 position to complete compressed key $CK_1$ in the first entry.

The next pair of keys ABC and ABCEF are then compared. (Each next compared pair of adjacent UK's includes the second Uk of the prior compared pair.) The equal bytes in the second key, ABCEF, beginning at its byte position after that entered in the P1 field, i.e. beginning at its byte position 2, and ending with its first unequal byte, are posted into the K2 field; in this manner bytes B, C and E are taken from the second UK and posted into the K2 field in FIG. 1B. The posting ends with the byte E first comparing unequal which is at byte position 4 in the second UK of the pair; and the position of the first unequal byte is posted into the P2 field, i.e. 4. Next, the pointer R1 is posted to complete the first high-level compressed key entry in FIG. 1B.

The second entry in FIG. 1B is generated in a similar manner in which its P1 and K1 fields are generated from the comparison of the next pair of UK's, i.e. ABCEF and DHMN wherein the P1 position is at byte position 1 since bytes D and A compare unequally. Hence D from the second UK in the comparison is entered into the K1 field and 1 is entered in the field P1 of the second entry.

The P2 and K2 of the second entry are generated by comparing the next pair of UK's which are DHMN and DI. The comparison finds equality for their first bytes D and D, and then finds inequality for their next bytes H and I which stops the comparison by posting byte I from the second UK of this pair into the K2 field, and a 2 into the P2 field.

The second entry is made complete by entering the pointer R2 into FIG. 1B.

Then the first part of the third and last entry is generated in FIG. 1B by going to the next pair of UK's, which are DI and MAP, and by comparing them to generate P1 and K1. In this comparison the first byte position is unequal, and hence byte M is posted into the K1 field and 1 is posted into the P1 field in the manner previously explained to complete the $CK_1$ generation.

The $CK_2$ generation for the last entry in the high-level compressed block shown in FIG. 1B involves a special situation in which a zero is posted into the P2 field. Since the zero in the P2 field is made unique to the last entry, it can later be used during searching for determining when the end of block is reached. Accordingly the zero is posted as the CK2 part of the last entry in the block when the second key of a pair is represented by an end-of-record representation or signal. There are no K bytes posted into the last K2 field, and consequently the $CK_2$ representation in the last entry of the block has only the single zero. The pointer R3 is then posted to complete the last entry in the block shown in FIG. 1B.

The specific generation example in FIGS. 1A and 1B provide a very simple situation. This generation process is explained in more detail the respect to FIGS. 13 and 14 which handle the UK's and CK's in a manner which provide a more complete understanding of the process for generating the high-level compressed index.

This compressed index can be used for searching in the manner explained technically in related patent application serial number 836,825 by the same inventors. In the search process of that application, any one of the UK's shown in FIGS. 1A may be used as a search argument (SA) for searching against the compressed index in FIG. 1B, in which there is sufficient information for determining the correct address R1, R2, or R3 which locates the data block representing the search argument. Thus any UK used in the generation process may later be used as a search argument for finding the data block represented by that UK.

It is therefore apparent that the number of bytes in the compressed index in FIG. 1B is less than the number of bytes in the uncompressed index shown in FIGS. 1A. It is this reduction which provides an advantage in using the compressed index instead of the uncompressed index for later searching operations. This advantage increases as the size of the base increases.

Figures 3, 4A, 4B, 5A, 5B:
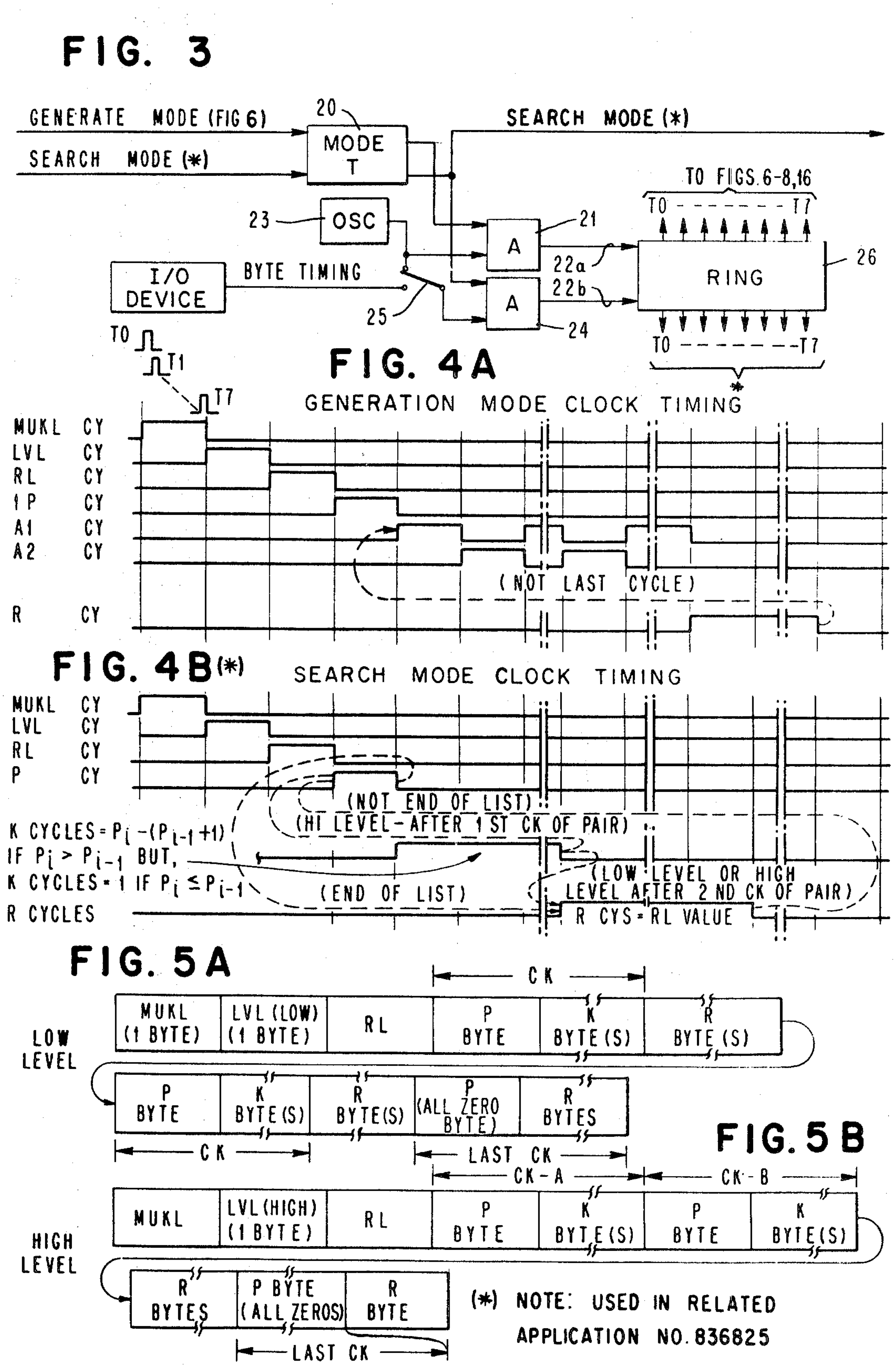

The mode and timing circuits shown in FIG. 3 control the operation of the hardware embodiment in this application in a manner similar to that described in prior application 788,876. The waveforms in FIG. 4B show the relative timing operation for the triggers identified in the clock circuit in FIGS. 9A and 9B. The waveforms in FIG. 4A show the relative time operations in a similar clock circuit used in generate mode in technically related application 836,825. FIG. 5B shows the sequence of cycles provided by the clock circuits in FIGS. 9A and 9B for high-level search operations. FIG. 5A shows for the sake of comparison the clock cycle for a low-level search operation.

Prior to the start of the method in FIG. 10, it is required that input I/O device 530*a* contain the L1 sequence of UK blocks which were derived by means outside of this invention as previously explained. Before starting, it is also required that memory 510 be loaded with the Level Control Tables shown in FIG. 14B, the Pointer Tables shown in FIG. 14C, and a Command Table having commands decodable by command decoder 513 in FIG. 14A.

Accordingly in FIG. 10, the method begins with start signal step 410 which may be generated by manually pushing a button on CPU 511, but preferably it is generated by an instruction execution, as is commonly done to start a computer operation.

Steps 411, 412, and 413 respond to step 410. Step 411 accesses the L1 pointer table which is shown in FIGS. 12E and 14C. Step 412 accesses the original L1 uncompressed index sequence on I/O device 530*a*, such as by moving the tape to the proper file or by positioning the head of a disk to the proper tack, etc. The step 413 accesses the first uncompressed block BL1—1 of the L1 sequence as shown in FIG. 12A and TABLE A.

Figures 12A, 12B, 12C, 12D, 12E:
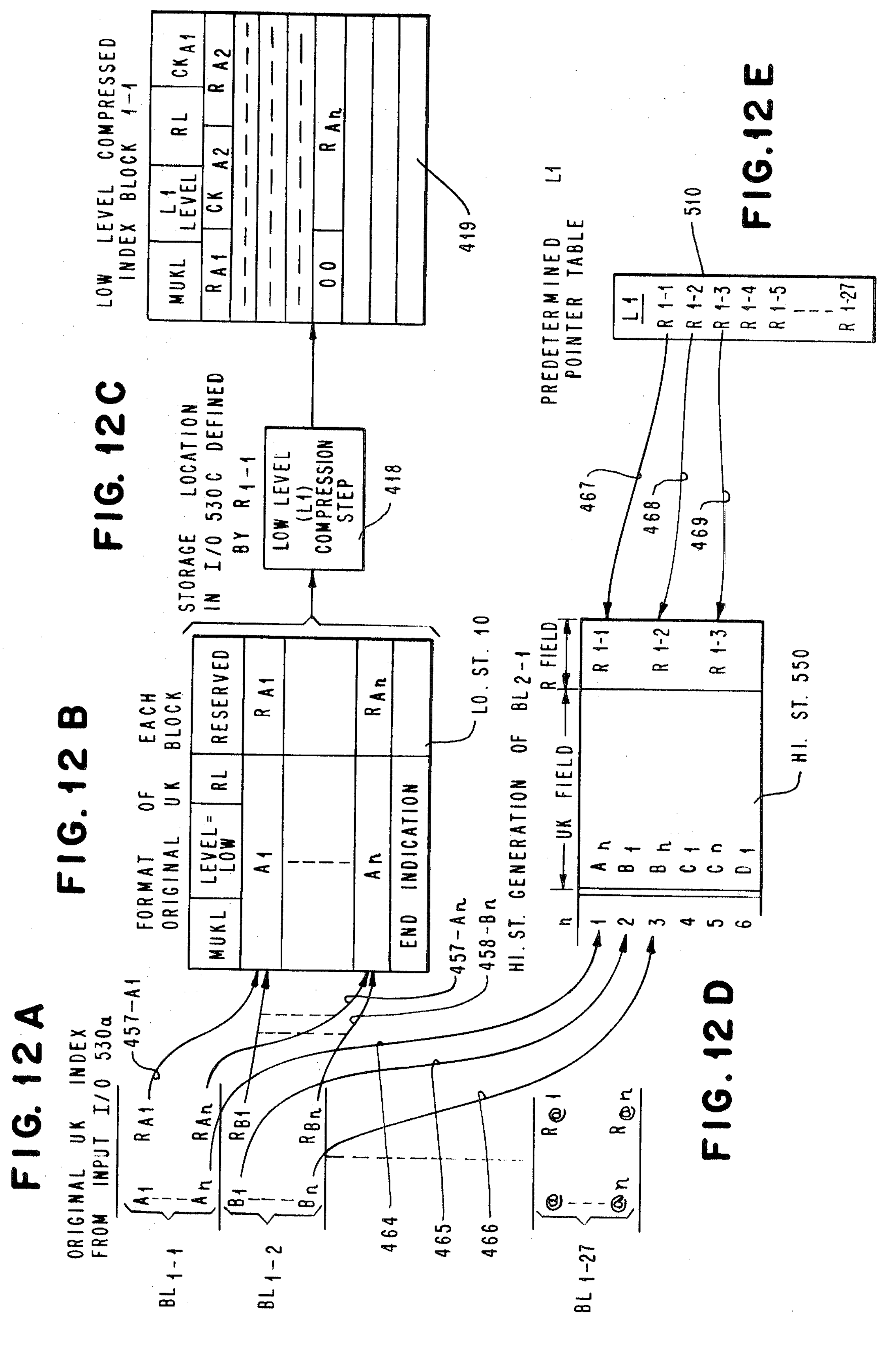

Step 414 then reads the accessed block 1—1 from FIG. 12A into the low store 10 in FIG. 12A via paths 457-A1 to 457-An in FIGS. 12A and 12B. This transfer moves all L1 uncompressed keys $A_1$.....$A_n$ and their respective pointers $R_{A1}$.....$R_{An}$ of block 1—1 into corresponding positions in low store 20.

When the last uncompressed key $A_n$ is read, step 414 also transfers (without pointer $R_{AN}$) via path 464 from FIG. 12A to 12D the key $A_n$ as the only item of first block 1—1 into a high store 550. FIG. 12D shows key $A_n$ as the first compressed key of the L2 block being generated in the high store. Hence the pointer $R_{An}$ is transferred only to the L1 index in Low Store 10. Step 416 is then executed which transfers the next pointer from the L2 pointer table in memory 510 shown in FIG. 12E. Initially the next pointer is the first pointer $R_{111}$, which is transferred via path 467 from FIG. 12E to 12D into to high store 550 at the location associated with the uncompress key $A_n$.

Step 417 follows to assure the demarcation of an end block boundary in low store 10 by inserting an end indication immediately following end of the block. The end indication may be zeros, all blanks, or a special character which is recognized as an end indication.

Step 418 responds to generate a compressed key block from the uncompressed block in low store 10. This may be done by the block compression technique described in either previously cited application 788,807 or 788,876. For the purpose of a specific embodiment, the compression method in application 788,876 is herein represented by FIG. 6 through 8D. In the later case, the compressed block overlays the uncompressed block in low store 10. Step 419 then transfers the compressed block in low store 10 to output I/O device 530*c* at its location designated by the last pointer $R_{111}$ transferred from the L1 pointer table to high store 550.

Then step 421 signals whether or not the last block read from the input sequence ended the L1 index. Step 422 is entered if it was not the last block, or step 441 is entered if it was the last block of the L1 index.

When step 422 is entered, there are further blocks in the L1 index, and accordingly the next block is accessed on input I/O device 530*a*.

Step 423 can concurrently be executed with step 422 and indicates whether the block being generated in high store 550 is full. Step 431 is entered if the high-store block is full, or step 424 is entered if it is not full.

Since the high store block is not full, step 424 reads the UK's and Pointers of L1 input block 1—2 accessed by step 422 into low store 10 via paths 457–A1 to 457–An from FIG. 12A to 12B. The first uncompressed key $B_1$ of block 1—2 is also transferred via path 465 from FIG. 12A to 12D without its pointer $R_{B1}$ to high store 550 as the second uncompressed key therein. As the reading of block 1—2 comes to an end, the last uncompressed key $B_n$ is also transferred without its pointer $R_{Bn}$ via path 466 from FIG. 12A to 12D to high store 550.

After execution of step 424 the method switches back to step 416 which transfers via path 468 from FIGS. 12E to 12D the next pointer $R_{112}$ from the L1 pointer table in FIG. 14C into the high store 550 shown in FIG. 12D. In the manner previously explained, step 417 demarks the end of the block in low store 10 in preparation for its compression operation which is performed by step 418, after which step 419 transfers the compressed form of block 1-2 from low store 10 to output I/O device 530C at a location thereon designated by the last pointer $R_{112}$ from the L1 pointer table.

The method cycles via the steps 421–424 and back to 416 etc. until either step 421 senses the end of the input L1 index or step 423 senses the block in high store 550 is full (except for one more UK). If step 423 first senses that the high-store block is full, step 431 is entered. The high-sotre full indication by step 423 is provided when the second last UK is provided to high store 550, so that there is room remaining for the last UK of the high-store block, which is to be provided by step 431. Accordingly step 431 reads the next accessed L1 input block, outputting only its first UK into high store 550; nothing is read into low store 10. Hence this first UK of the input block is the last UK of the current high-store block. The first block in high store 550 is block 2—1 of the L2 UK block sequence.

Then step 432 transfers the uncompressed key block 2—1 from high store 550 into intermediate I/O device **530*b* from which it is later accessed for final processing. This block 2—1 in intermediate storage device 530*b* is represented in TABLE A, column L2. The intermediate blocks are sequentially written on intermediate I/O device 530*b* in order in which they are generated. Later when UK block sequence L2 is completed, it will be accessed in the same order in which it was generated. Therefore I/O device 530*b*** also can appropriately be a magnetic tape drive, or a disk or drum device used serially.

Step 433 may be executed concurrently with step 432 when different I/O devices are used. Step 433 reaccesses the last UK block read from input device **530*a* by step 431. Then step 414 is reentered, and the reaccessed block is read into low store, while only its last UK is read into high store as the first uncompressed key of the next block being generated in high store 550. Then step 416 transfers the next pointer $R_{11x}$ from the L1 pointer table via path 469 next to the first UK in high store 550**.

The reason for the rereading of the L1 block which provides the last UK for an L2 block in high store 550 is because its first UK (such as $D_1$) ends an L2 block, while its last UK (such as $D_n$) is the first UK of the next L2 block which cannot be read into the high store until after its full block has been stored on the intermediate I/O **530*c***.

Alternative solutions avoiding the rereading are (1) to provide a double size high store that does not overlay sequentially generated blocks, or (2) to readout the last UK of the same block from low store into the beginning of high store after outputting the latter.

The method continues in the manner previously explained until step 421 senses the end of the L1 index on I/O device **530*a*. Then step 441 is entered which causes the uncompressed block currently in high store 550 to be transferred as the last L2 uncompressed block on intermediate I/O 530*b*. This ends the L2 sequence represented in TABLE A column L2. Step 442 then stores an end-of-file indication at the end of L2 block sequence on intermediate I/O 530*b***.

Then step C1 unconditionally switches the method to step 444 shown on FIG. 11. FIGS. 13A through E are referenced during the explanation of FIG. 11. Step 444 in FIG. 11 accesses the pointer table predetermined for the next higher level, which now is the L2 pointer table shown in FIG. 13E. Concurrently, the start of the last generated file L2 on intermediate device **530*b* is accessed by step 446. Then step 447 accesses its first UK block in the L2 file. The rolls of devices 530*a* and b are now swapped; intermediate I/O 530*b* now does the inputting of blocks into low store 10, while I/O 530*a* receives the next intermediate UK block sequence from high store 550**.

Step 448 is next entered and its purpose is to adapt the high index level compression operation to the method explained in previously cited application 788,876. A new format is generated herein for high-level compressed index block. Step 448 simulates a dummy UK as the first UK in low store 10. The dummy UK is made up of the lowest characters in the collating sequence being used. It may be for example all blanks, or all zeros, as the case may be. It may be provided from the level control tables in memory 510 and transferred to the first UK position in low store 10.

Figures 13A, 13B, 13C, 13D, 13E:
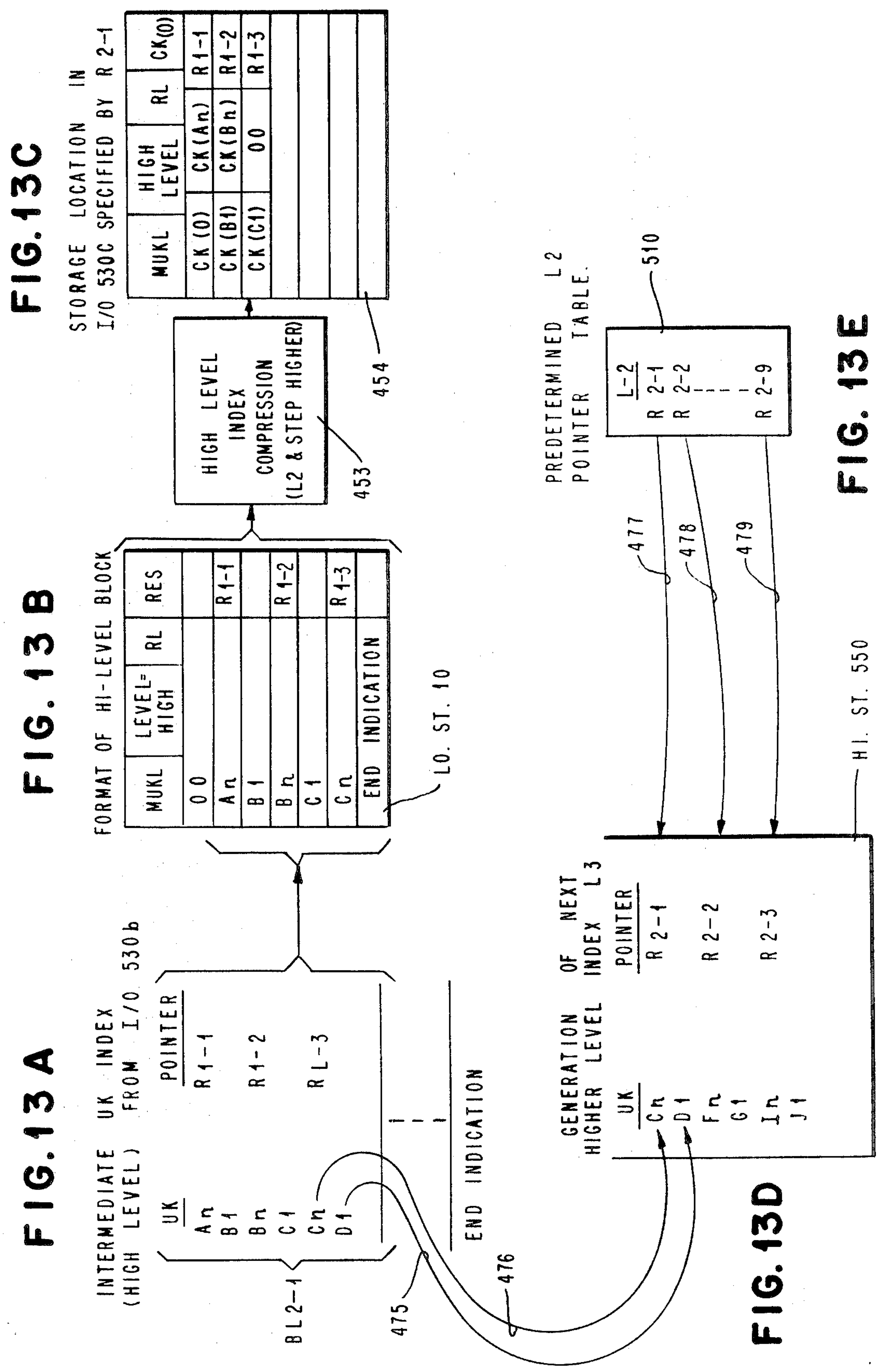

Then step 449 reads the L2 block (accessed by step 447) shown in FIG. 13A as BL2-1. Block 2—1 is read in its entirety of UK's and pointers into low store 10 following the dummy UK. However only its last pair of UK's ($C_n$ and $D_1$) are read into high store 550 via paths 475 and 476 in FIGS. 13A through D as the first two UK's of the block being generated therein. Hence no pointers are read from intermediate I/O device into the high store. Instead step 451 transfers the next pointer (in this case the first pointer $R_{211}$) from the current pointer table (now currently the L2 pointer table) into high store 550 in association with the first pair of UK's ($C_n$ and $D_1$). Step 452 operates to complete the formating of the block in low store 10 in preparation for its compression by replacing the last UK $D_1$ with an end indication or some other identifying character which is recognized as the end of the block in low store 10. The block in low store 10 is now in a format condition ready for compression.

Step 453 then compresses the block in low store 10.

Step 454 transfers the CK block from low store 10 to a location on output I/O device **530*c* designated by the last pointer R2-1 transferred from the L2 pointer table shown in FIG. 13E**.

Then step 456 performs a switching function dependent upon whether the last block read by step 449 from the intermediate unit was the last block of the L2 sequence being inputted from intermediate I/O device **530*b*. If not at the end of the L2 sequence, step 461 is entered, or step 471 is entered if the end of the L2 sequence is indicated. Since this point is not the end of the L2 sequence, step 461 is entered, which is another switching operation dependent upon whether the UK block in high store 550 is full. If not full, step 462 is entered, but step 472** is entered if the high-store block is full.

Since the high-store block is not full at this time, step 462 accesses the next UK block in the L2 sequence on the intermediate I/O **530*b*. Then the method switches back to step 448 to repeat for the next inputted block in which the last pair of UK's ($F_n$ and $G_1$) are read from this input block to high store 550, and step 449 transfers the next pointer $R_{212}$ from the L2 pointer table to the high store 550** in association with the last UK pair $F_n$ and $G_1$.

The method cycles in this manner unit step 461 detects that the L3 UK block generated in high store 550 is full. Step 472 is then entered and transfers the L3 UK block from high store 550 to intermediate I/O **530*a* to being the L3 UK block sequence, which is the next higher level. Since the intermediate storage of blocks in the sequence L3 are interleaved with the reading of blocks from the intermediate sequence L2, it is preferable (although not essential) that different intermediate I/O devices be used (i.e. tape units 530*a* and *b***). Although different extents within the same cylinder of a disk or drum could also efficiently be used.

Step 462 is entered to access the next input block on I/O **530*b*, and then step $C_1$ switches the method back to step 448** to recycle.

Ultimately, the last block in the intermediate L2 input sequence on I/O **530*b* is sensed by step 456 which causes a switching to step 471**.

Step 471 may end the multilevel index construction whenever the highest level comprises only a single compressed block (apex) in low store 10 when the end of the low-store input sequence is sensed. This can be done in a number of ways, such as sensing if only a single pointer, or if only a single pair of UK's are in high store 550 when the end of the input sequence is sensed. Thus step 471 senses when the number of UK's in high store equals Q. If Q is set to 2, the single high-level block in low store 10 is the apex of the index. If set to 4 or a higher even number, a plurality of blocks exist at the highest compressed level. In general a single compressed block at the apex level is required. When step 471 indicates equality with Q, a switching to step 481 store the pointer(s) in high store 550 at any predetermined location to comprise the highest level indication, which for example may provide the level 5 index in FIG. 9 that may be placed in a catalogue for accessing the compressed multilevel index. Then step **482*a*** is entered to end operation.

The predetermined setting of a switch 474 cooperates with step 471 to determine the apex conditions for any multilevel index being generated. The setting of switch 474 determines whether number of levels of index can or can not exceed a given number of levels U. If set to switch contact **474*b*, the index generation ends when the highest level compressed block is at level U, unless the generation is previously ended by step 471 sensing its ending condition. Step 483 is entered when switch 474 is set to contact 474***b*. Step 483 tests if the number of the current level is equal to U. If not, it exists at C1. If equal to U, step 483 exits at ending step 483*b*. Although not shown in FIG. 11, it is desirable that a step identical to step 481 be executed upon the exit from step 483 to 483*b* to store the pointers in high store 550 for cataloging the compressed index. On the other hand if the switch is set to contact 474*a* the number of index levels continues to be increased until a level is reached which satisfies the Apex conditions of step 471.

Step 472 is entered whenever the conditions of step 471 are not satisfied. Step 472 transfers the last block from high store 550 onto intermediate I/O 530*a* as the last block of the higher level sequence. Step 473 is then entered to indicate the end of file for this intermediate UK sequence on I/O 530*a*.

A switch back via exit C1 then occurs to begin the construction of each next higher level of index until a single block exists when switch 474 is at contact with 474*a*, or until a particular number U of predetermined high levels is not exceeded when the switch is set to contact 474*b*.

The next explanation is of the generate mode circuitry in FIGS. 15–23 in relation to the steps of the method shown in FIGS. 24A–E, which is a species of the general method shown in FIGS. 10 and 11. Reference numbers in the 500 series refer to FIGS. 14–23 and reference numbers in the 700 series refer to FIGS. 24A–E.

In FIG. 14A, a bus 511A transfers commands and data selected from memory 510 to interface controls 512 which distributes received commands to a command decoder 513. The interface controls 512 in FIG. 15 has output lines 511B, 512A–D, of which bus out line 511B transfers data fetched from memory 510. I/O select line 512A transmits signals for selecting one of the I/O devices 530*a*, *b*, or *c* in FIG. 17. A CPU stop line 512B provides a signal from the CPU to the I/O control to end operation upon completion of a CPU transfer. The line 512D indicates that CPU has accepted status signals from the interface controls 512.

Figure 15:
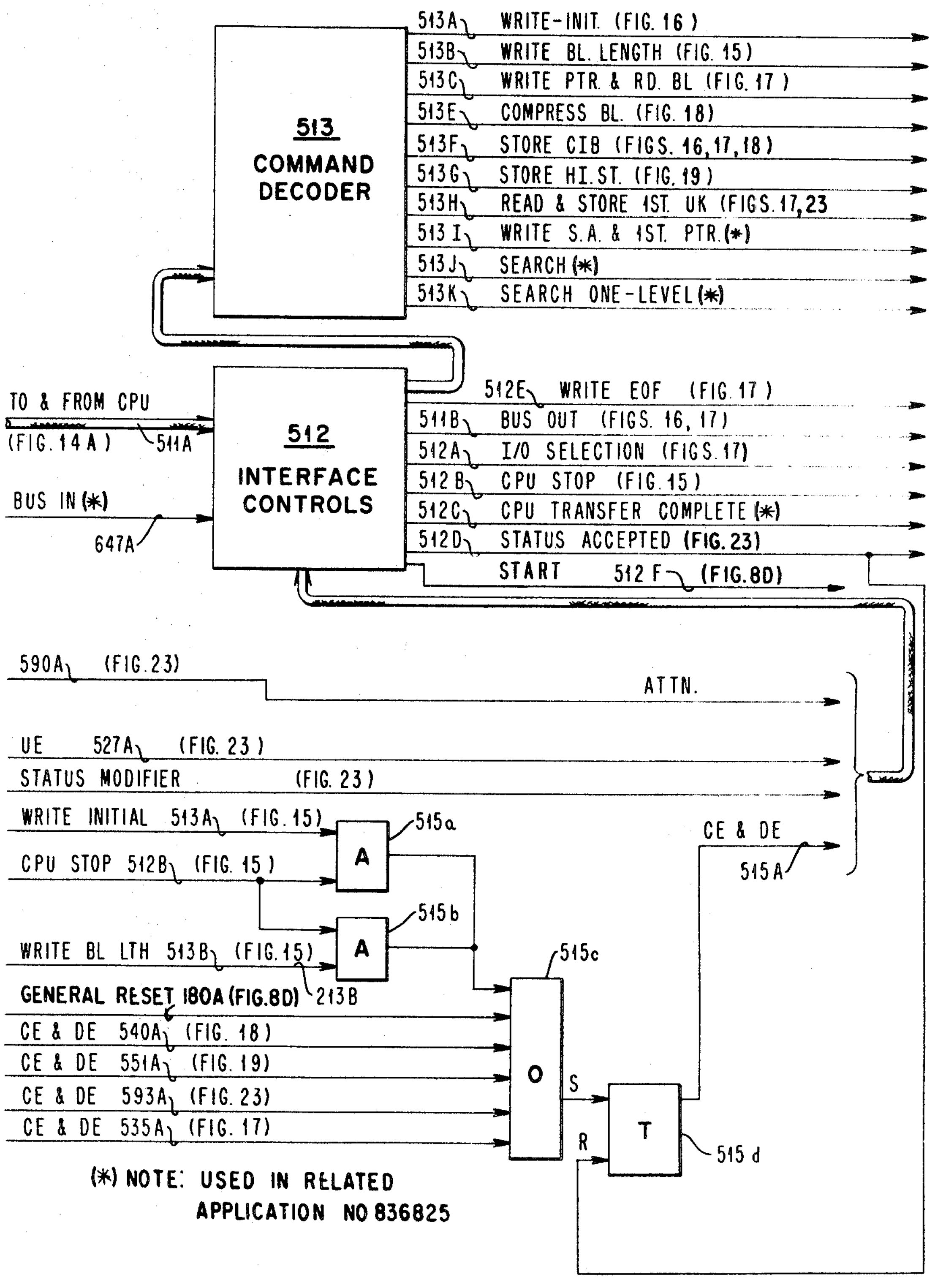

Command decoder 513 decodes each command received from the CPU. Each output line 513A–K signals the decoding of a different command, represented by the label on the respective line, and the line remains active until execution of its command is completed. Also a plurality of input control lines at the bottom of FIG. 15 are provided within the index controls 516 to interface controls 512. These input control lines are included with their meaning, singly or in combination, in the following legend:

| Interface Control Line | Signal Meaning |
|---|---|
| 1. C.E. & D.E. | End of any block signal |
| 2. Unit Exception(U.E.) | End of file signal |
| 3. Attention(ATTN.) | High Store 550 block is full with high level block in low store 10 |
| 4. U.E. and ATTN. | Apex level block is in low store 10 |
| 5. Status Modifier(S.M.) | High store block is full with low level block in low store 10 |

A pulse on the C.E. & D.E. line is transmitted by interface controls 512 to the CPU, which then fetches the next command from the command table in memory 510 and causes its transmission down bus 511A and controls 512 to decoder 513, to initiate the next step by index controls 516 or I/O controls 530. A pulse on the S.M. line to interface 512 causes a specific command (read and store first UK) to be fetched and executed.

Figure 22:
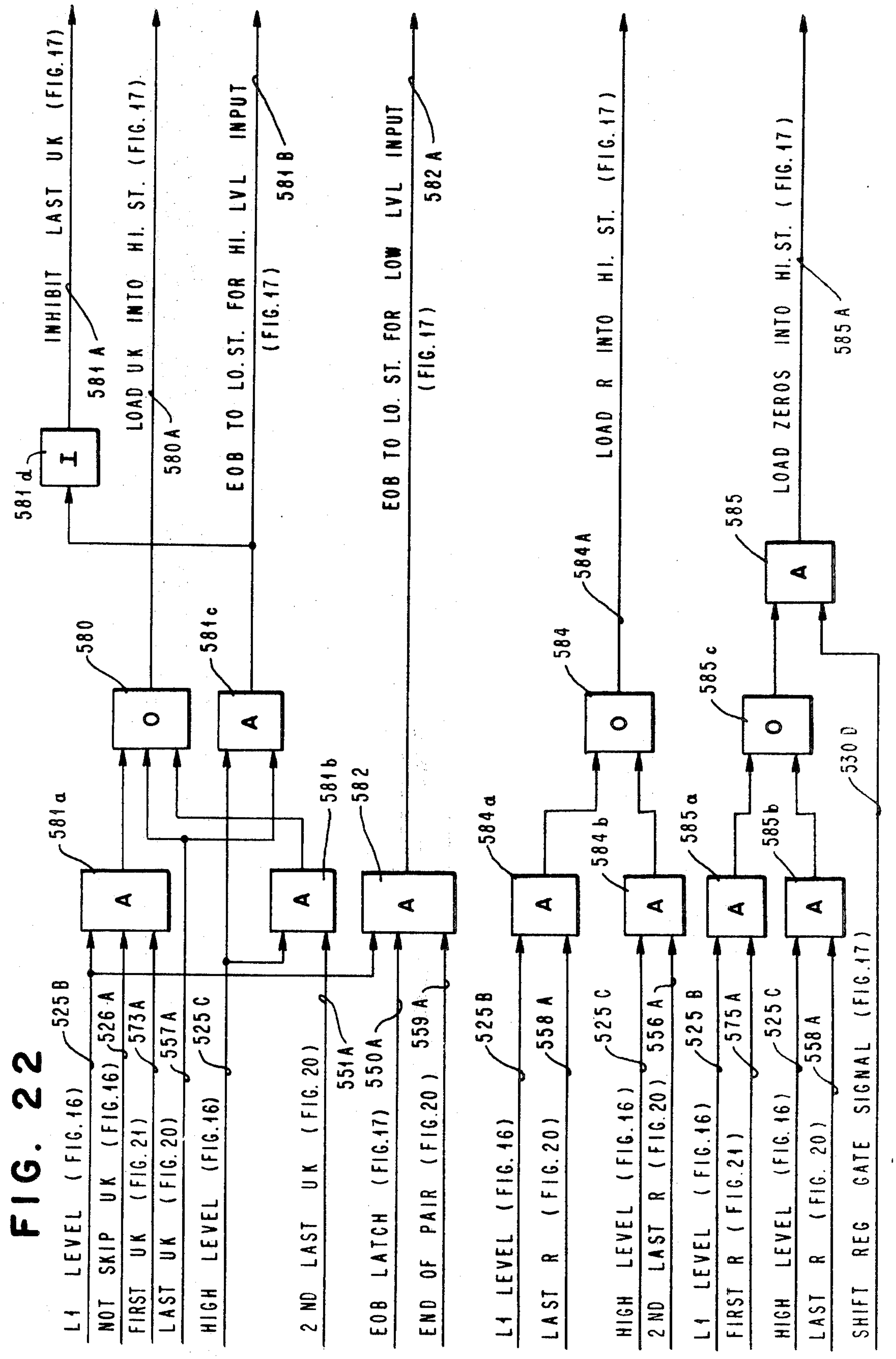
Figure 23:
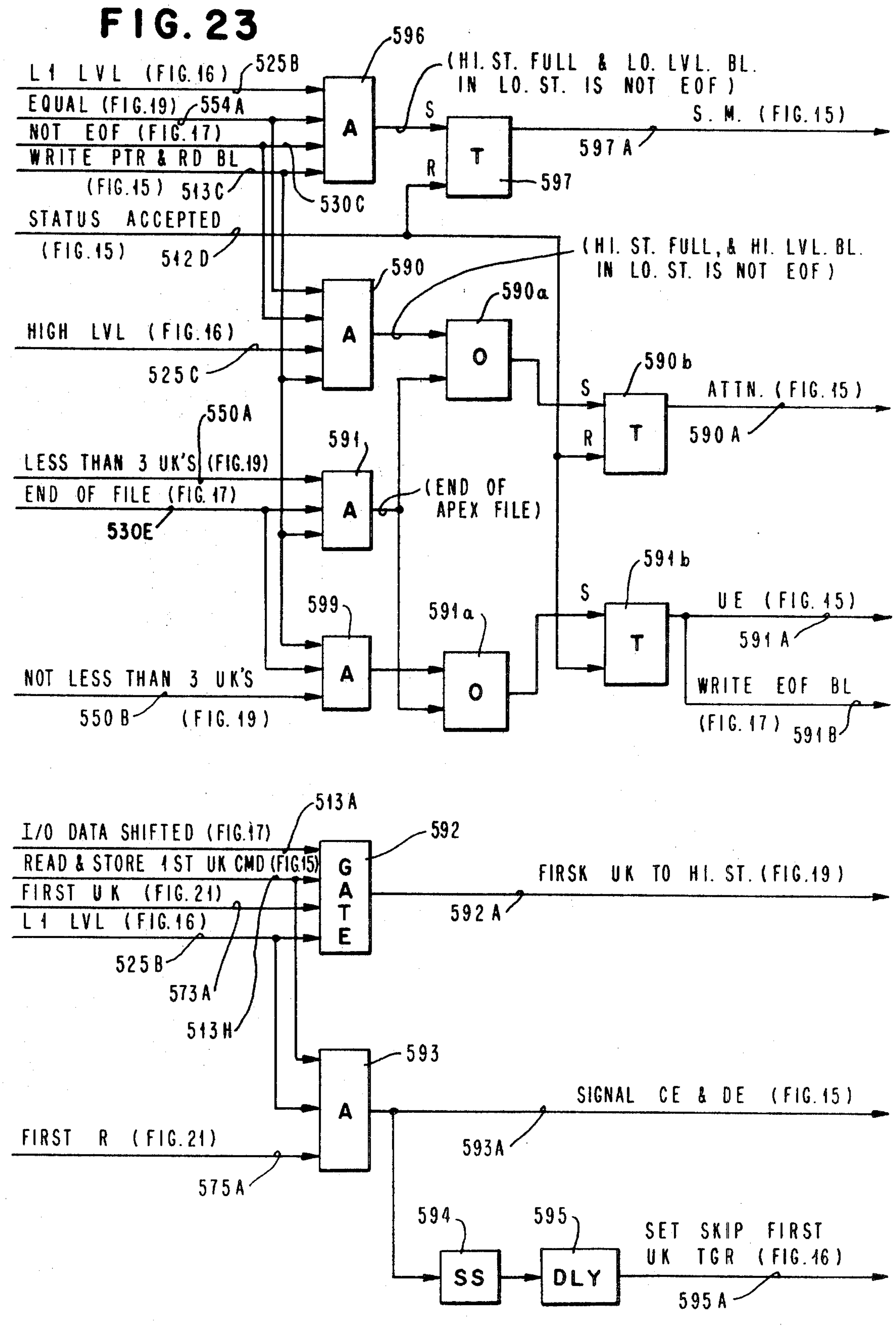
Figure 24A:
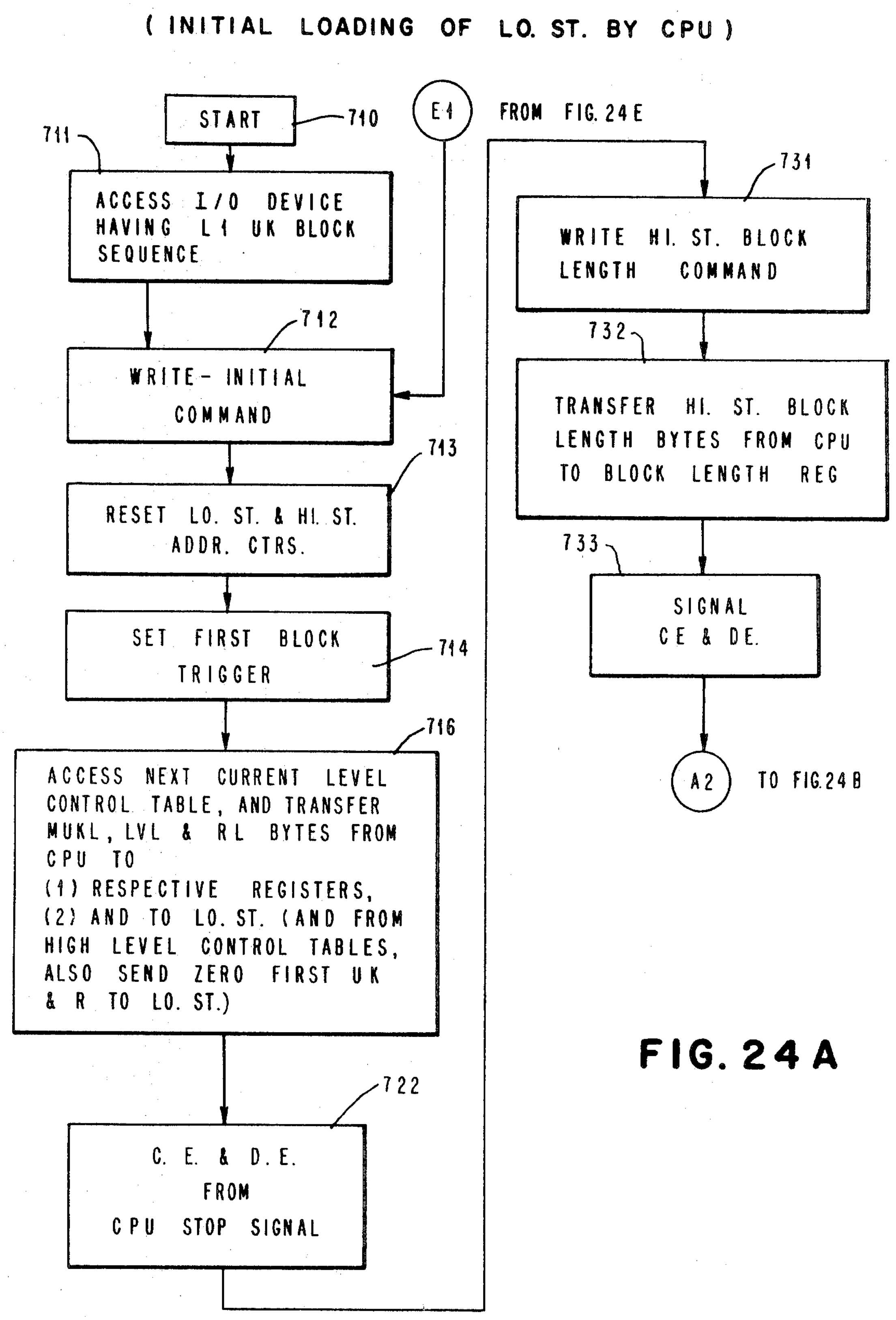

Any index generation operation in FIGS. 14–23 begins with a start step 710 in FIG. 24A, which initiates the index generation method after memory 510 is loaded with the command tables, level control tables, and pointer tables shown in FIG. 14A, 14B, and 14C. Step 711 results from start step 710 and accesses the low-level sequence (L1) of UK blocks on I/O device 530*a*, which is the initial input sequence of uncompressed data for initiation of operation by the invention.

Line 512A signals the initial selection of input I/O 530*a* and the accessing of the first L1 block thereon.

Step 712 also is initiated by start step 710 and may operate concurrently with step 711 to issue a write initial command as the first of a plurality of commands in the command table in memory 510. Like any command, the write initial command is transmitted to decoder 513 which decodes the unique combination of bits comprising the command to activate the unique output line 513A in FIG. 15.

Steps 713, 714 and 716 respond to the write initial command. Step 713 resets the low and high-store address counters by activated line 513A actuating single shot 521 in FIG. 16, which outputs a pulse that resets low-store address counter 11*a*in FIG. 16 and resets high-store address counter 550*a* in FIG. 19 via lead 521A. Step 714 sets first block trigger 526*a* in FIG. 16 in response to the output from single shot 521.

Figure 16:
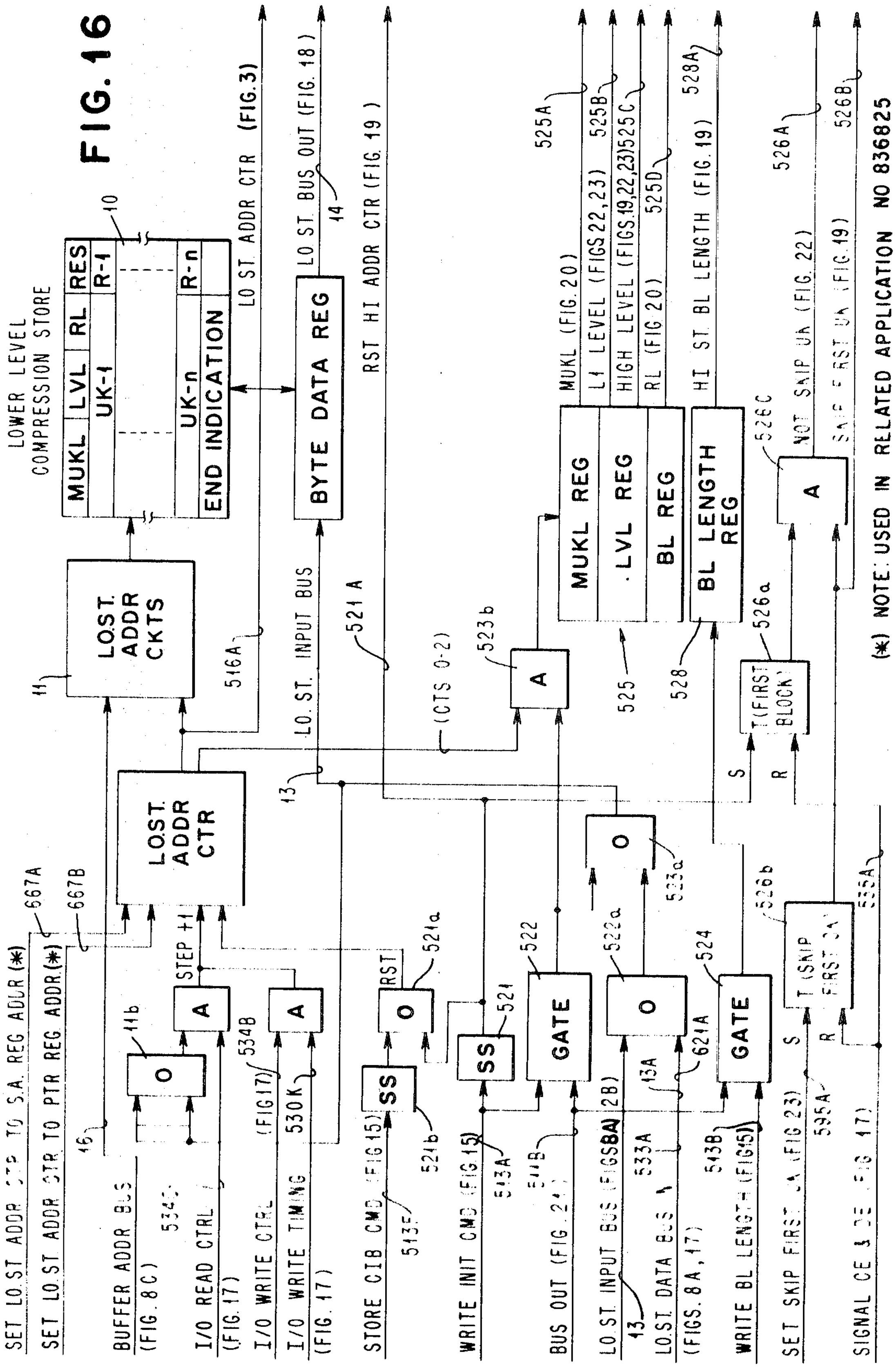

Step 716 transfers the first three items in the level control table L1 in FIG. 14B on bus out line 511B to shift register 525 in FIG. 16 via gate 522. Also these signals are simultaneously transferred through OR circuit 523*a* to a character gate circuit 11*b* and to byte data register 12 from which they are set into the initial byte positions of lower level compression store 10, as it is addressed by low-store address counter 11*a*. Counter 11*a* is incremented to the next address as each byte is received by character gate circuit 11*b*. Each byte received by character gate 11*b* has at least a single one bit (due to odd parity or to code choice) which generates a signal from each byte to increment counter 11*a* to the next byte address for store 10. Accordingly character gate 11*b* obtains synchronism in address generation for the transfer of bytes into store 10. AND circuit 523*b* only permits the first three bytes MUKL, LVL and RL to be transferred to shift registers 525, since AND 523*b* is only active during the address counts 0–2. When the input to register 525 is blocked after count 2, the RES byte continues to be transferred via the OR circuit 523*a* into store 10 from memory 510, because a byte transfer count in the command was previously set to cause transfer of the first four bytes in the L1 column of the level control table in FIG. 14B. When the write initial command CPU transfer is complete, the CPU issues a stop signal which activates interface output line 521B to an AND gate 515*a* in FIG. 15 which also receives the write initial command signal on line 513A to cause OR circuit 515*c* to signal the C.E. & D.E. on line 515A, which executes step 722. During high-level operation a zero first UK (dummy) and zero first pointer R (dummy) are sent to low store 10. The C.E. & D.E. signal goes to the CPU and causes issuance of the next step 731, which is the issuance of a write high-store block length command. Then step 732 transfers the block length bytes from the L1 level control table in FIG. 14A to register 528 in FIG. 16 via gate 524 and bus out line 511B.

The block length setting in register 528 controls the length of each L2 block about to be generated in high store 550. The block length may have any size required. At the end of execution of step 732, step 733 issues another CPU stop signal which activates an AND gate 515*b* in FIG. 15 to generate a C.E. & D.E. signal, which takes the sequence to switching step A2 to enter step 740 on FIG. 24B.

Figure 24B:
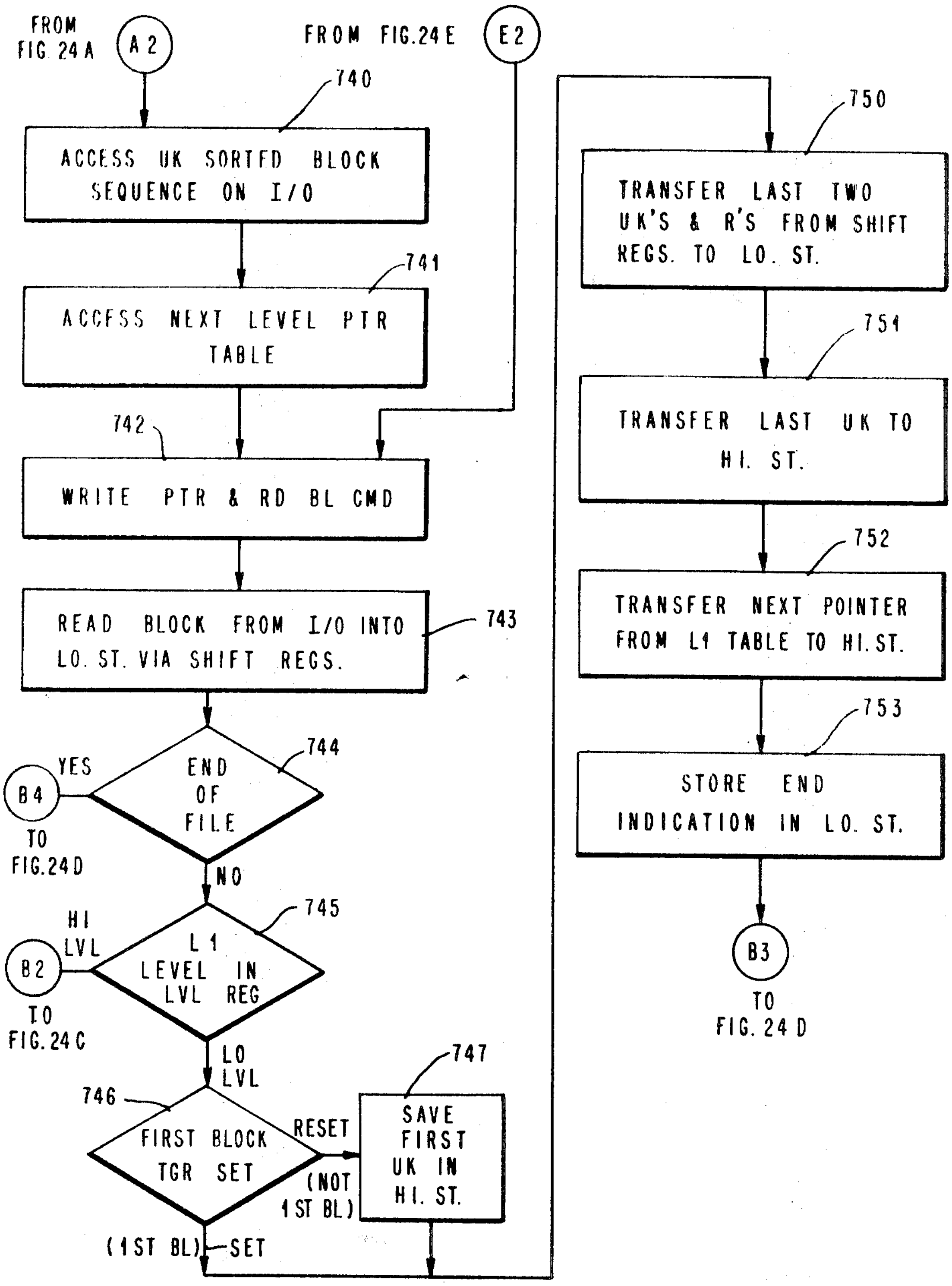

Steps 740, 741 and 742 in FIG. 24B occur concurrently in response to step 733 in FIG. 24A. Step 740 accesses the first block of the UK sorted block sequence on the input I/O device 530*a* which was accessed by step 711 in FIG. 24A. Step 741 accesses the next higher level pointer table, which initially is the L1 pointer table in FIG. 14C. Step 742 transmits a "write pointer and read block" command to decoder 513 which then activates line 513C to initiate I/O operation and do other preparatory tasks. Thus the "write pointer and read block" command also activates read I/O line 534A in FIG. 17, which sets a trigger 551 on FIG. 20, which then indicates that a block is to be read from I/O. Its setting fires a single shot to 551*a* that provides a pulse via OR 551*b* that resets a byte counter 553 prior to data being read from the block.

Figure 17:
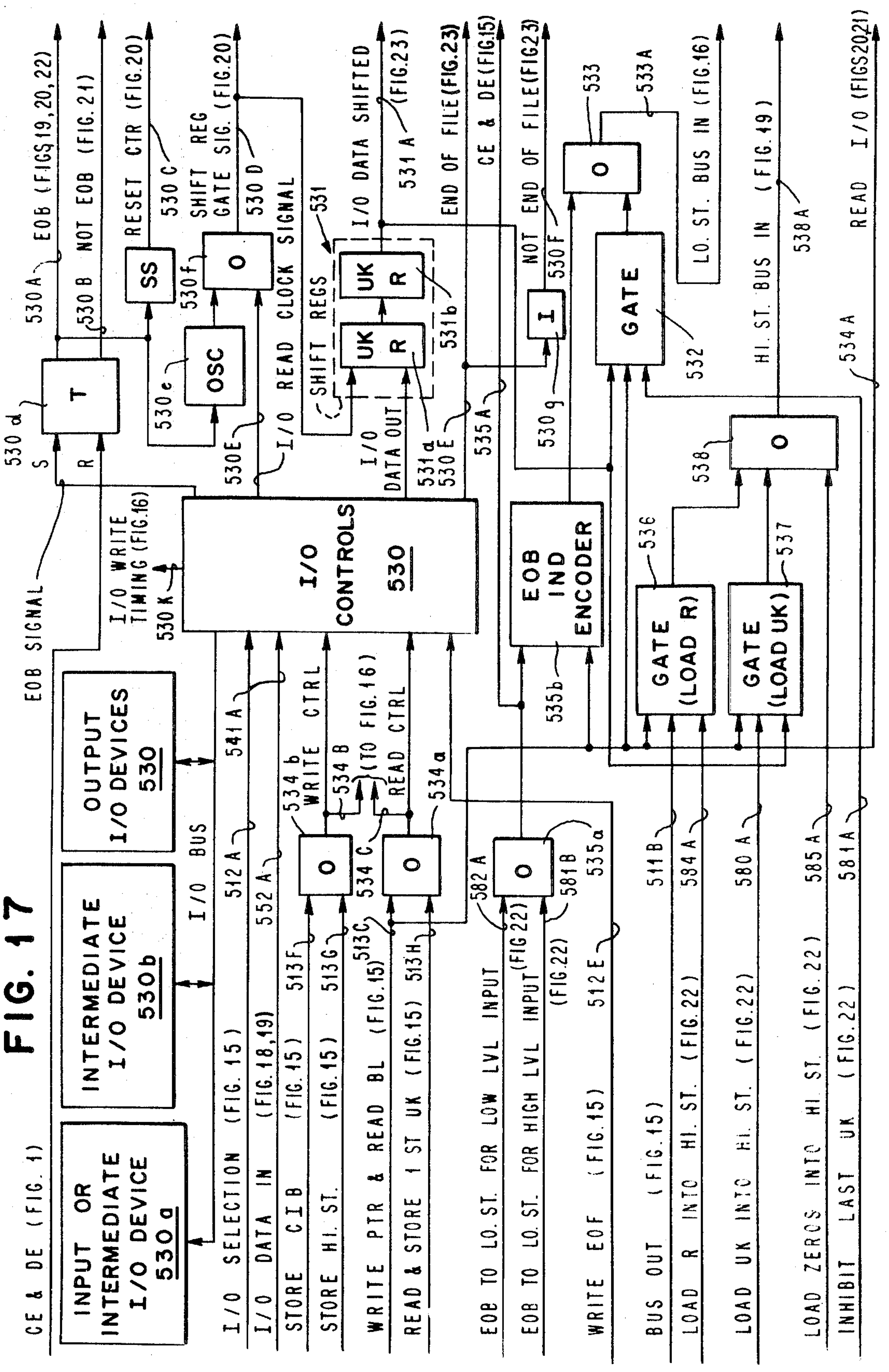

Step 734 responds to the read block order part of step 742 to read the block accessed by step 740; line 513C signals the read control input to I/O control 530 via OR circuit 534*a* in FIG. 17. The block being read may contain UK'S, or it may signal end-of-file, which is decoded by conventional circuits (not shown) found in I/O controls 530 to activate an end-of-file line 530E in FIG. 16. This executes step 744 and causes it to exit at B4 to FIG. 24D where appropriate action is taken, which is explained later. Index blocks on I/O 530*a* occur before any end-of-file block, and they are each read by step 734 through the I/O controls 530 to a shift register 531, wherein each uncompressed key and pointer is assembled in an input register 531*a*, and then is shifted to an output register 531*b*, so that input register 531*a* can then receive the next UK and R. The shift register output is provided on I/O data shifted line 531A, on which the data is delayed by two uncompressed keys behind the actual data being read into shift register 531 from the I/O device. This permits the end-of-block (EOB) signal from I/O controls 530 to set triggers 530*d* and activate EOB line 530A in time to signal the index controls 516 that the last pair of UK's are being sent from shift register 531.

An OR circuit 530*f* provides an output on line 530D to control shifting on a byte basis by shift register 531*a*. Thus the I/O read clock output is provided on an I/O read clock signal line 530E; it provides a pulse to OR circuit 530*f* for each I/O byte to control the shifting operation by register 531. An oscillator 530*e* generates the byte timing at the end of the block to shift out the last two UK's stored in register 531. Accordingly oscillator 530*e* is activated while trigger 530*d* is set. Thus oscillator 530*e* inputs to OR circuit 530*f* to continue its output pulse sequence after the end of block is reached on the I/O device.

Steps 745 and 746 initially are executed by L1 being in the level register 525 in FIG. 16 and first block trigger 526*a* being set. As a result, the first UK of the input block is not transmitted to high store 550 (this would require actuation of AND 581*a* in FIG. 22).

Then steps 750 through 753 are executed. Step 750 is executed by transfers through gate 532 in FIG. 17 timed by signals from invertor 581*d* in FIG. 22 as the last two UK's and R's are shifted out of register 531 by operation of oscillator 530*e*. Step 751 is also executed by lines 557A in FIG. 20 being activated during the last UK to OR circuits 580 which causes gate 537 in FIG. 17 to load the last UK into high store 550.

Figure 20:
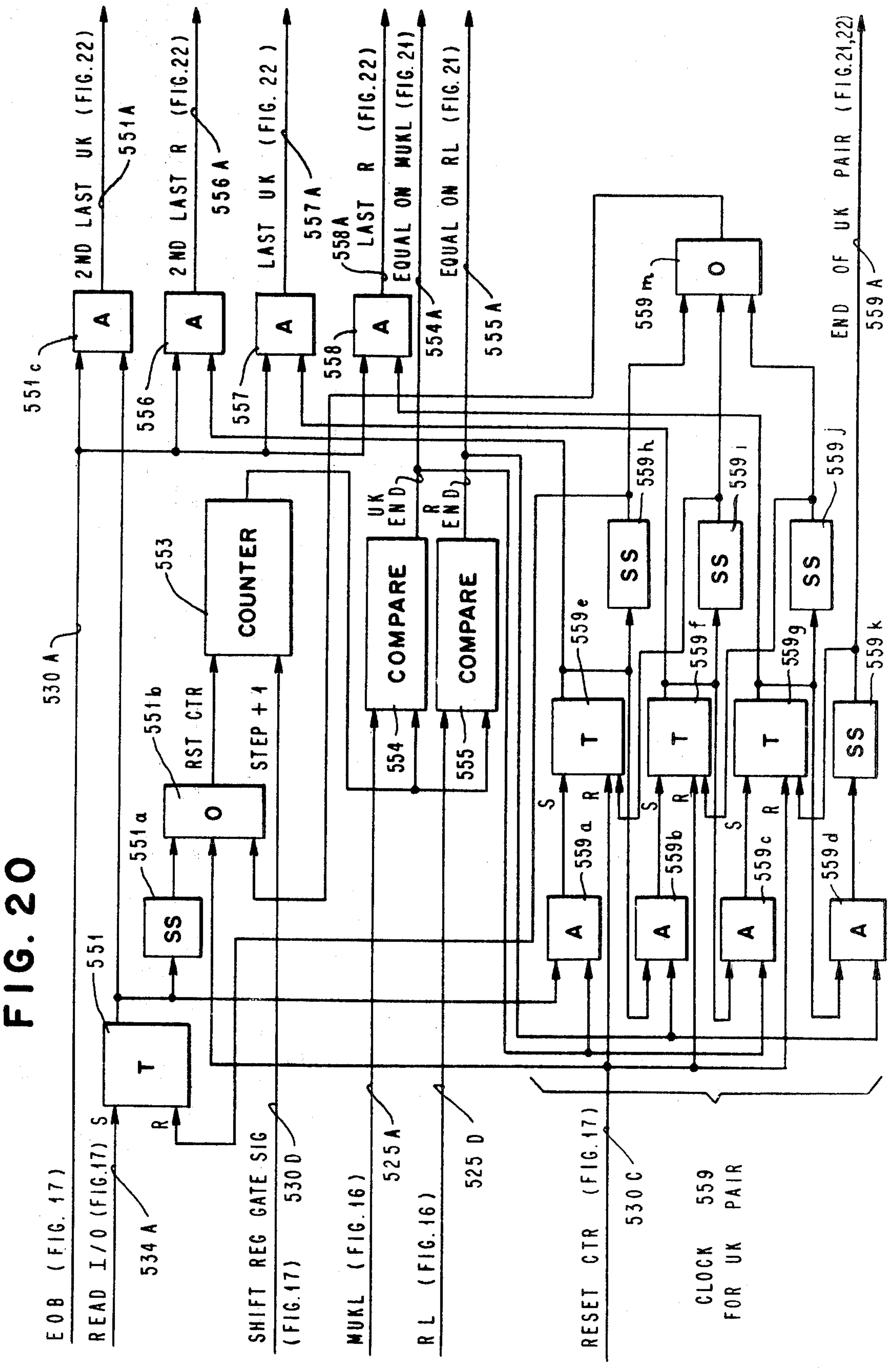
Figure 21:
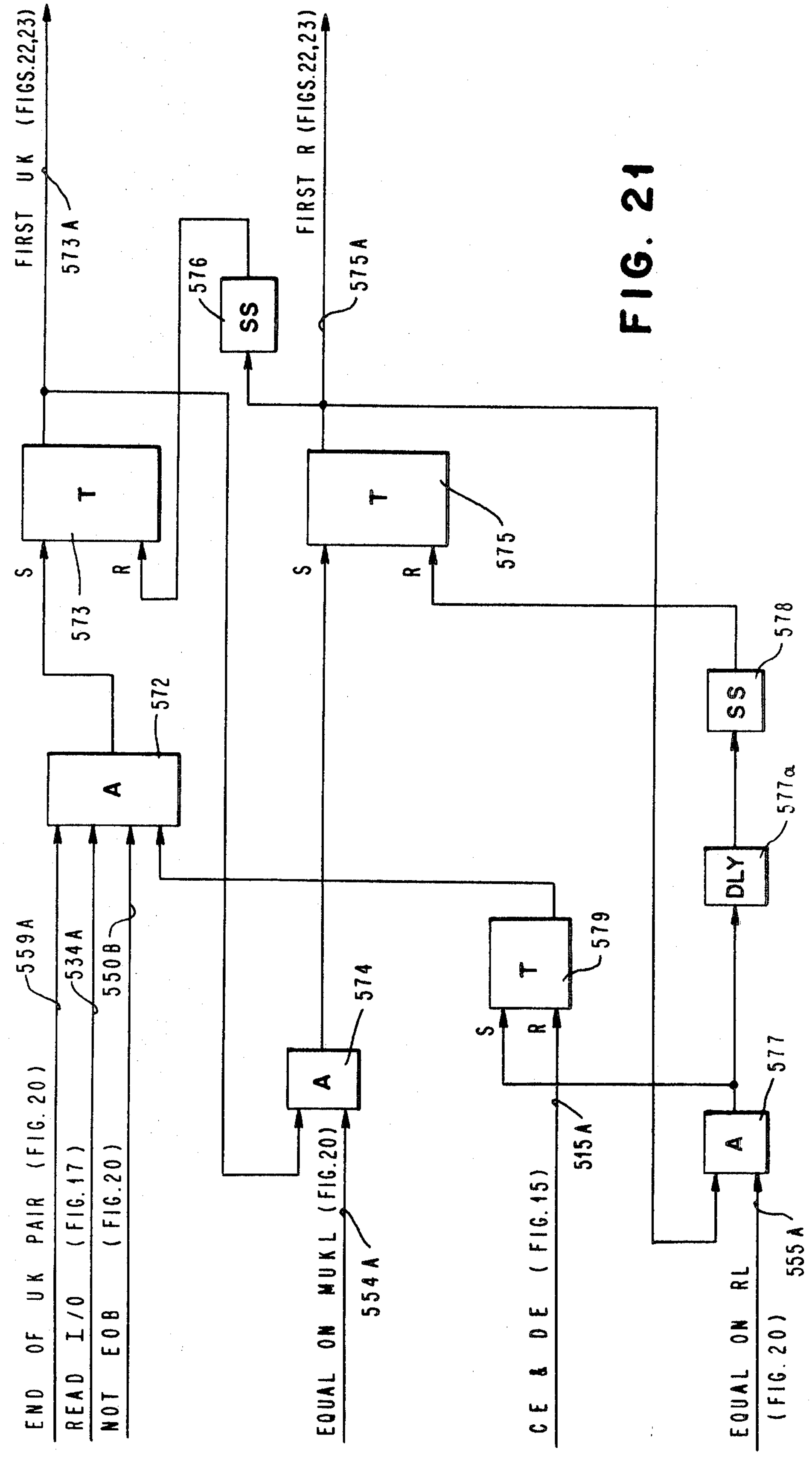

And gates 551c, 556, 557 and 558 in FIG. 20 signals the transmission of the last and second last UK's and their pointers on lines 551A, 556A, 557A, and 558A respectively, after receiving the end of block (EOB) signal from line 530A, which is sent by the I/O device two UK periods before the end of the block is seen at the output of shift register 531.

A UK pair clock 559 in FIG. 20 times the transfer of pairs of UK's and their R's. This includes timing the last pair of UK's and their R's through gates 551*c*, 556, 557 and 558. Furthermore it times the first pair of UK's and R's of each block, but this function is not used until the second and later blocks of the input block stream.

AND 551*c* is activated by the end-of-block signal on line 530A to indicate the second last UK is to follow next.

Then the triggers 559*e–k* in clock 559 are reset by line 530*c* by the end of block signal on line 530A which occurs just before the last pair of UK's and R's are sent from the shift register 531. The end of this second last UK is signalled by compare circuit 554 (which signals the end of every UK), which activates AND circuit 559*a* to set trigger 559*e* and activate AND 556 that the second last R is to follow. Single shot 559*h* then provides a pulse to reset the read I/O trigger 551, via OR circuits 559*n* and 551*b* to reset the UK counter 253 which counts the bytes of a UK or R.

And 559*b* is conditioned by the output of trigger 559*e* upon the occurrence of the R-end signal from compare circuit 555 which follows the end of the second last pointer and sets trigger 559*f* to indicate that the last UK will be next, which is signalled via AND circuit 557. Trigger 559*f* actuates single shot 559*i* which resets trigger 559*e* and pulses OR 559*n* to reset counter 553 in preparation for the last UK.

And 559*c* is conditioned by the output of trigger 559*f* and is activated when it receives the UK end signal from line 554A. It then sets trigger 559*g* and activates AND circuit 558 to indicate the last pointer is next. It actuates single shot 559*j* which resets trigger 559*f* from the shift register and pulses OR 559*n* to reset counter 553.

At the end of the last pointer, line 559A is pulsed to indicate the end of the block in low store 10. This is done by AND 559*d* while it is activated by trigger 559*g* to actuate single shot 559*k* upon the last R-end signal. This resets trigger 559*g* and provides a pulse on lead 559A indicating the end of a UK pair.

Step 752 is executed when the "write pointer" part of the "-write pointer and read block" command fetches the next pointer (which initially is the first) and transmits it to interface controls 512, from which it is transferred on bus out 511B to gate 536 in FIG. 17. The transfer from gate 536 to high store 550 via OR 538 is timed by AND 584*a* in FIG. 22, which causes this transfer to high store at the time that the last pointer (R) is being inputted into low store 10.

Step 753 is initiated when AND gate 582 is activated by the end of UK pair line 559A from FIG. 20 while it is conditioned by the L1 level signal on line 525B and EOB latch signal on line 550A. The operation of clock 559 in FIG. 20 is explained elsewhere in this specification, in which line 559A is activated at the end of the last UK pair.

Figure 19:
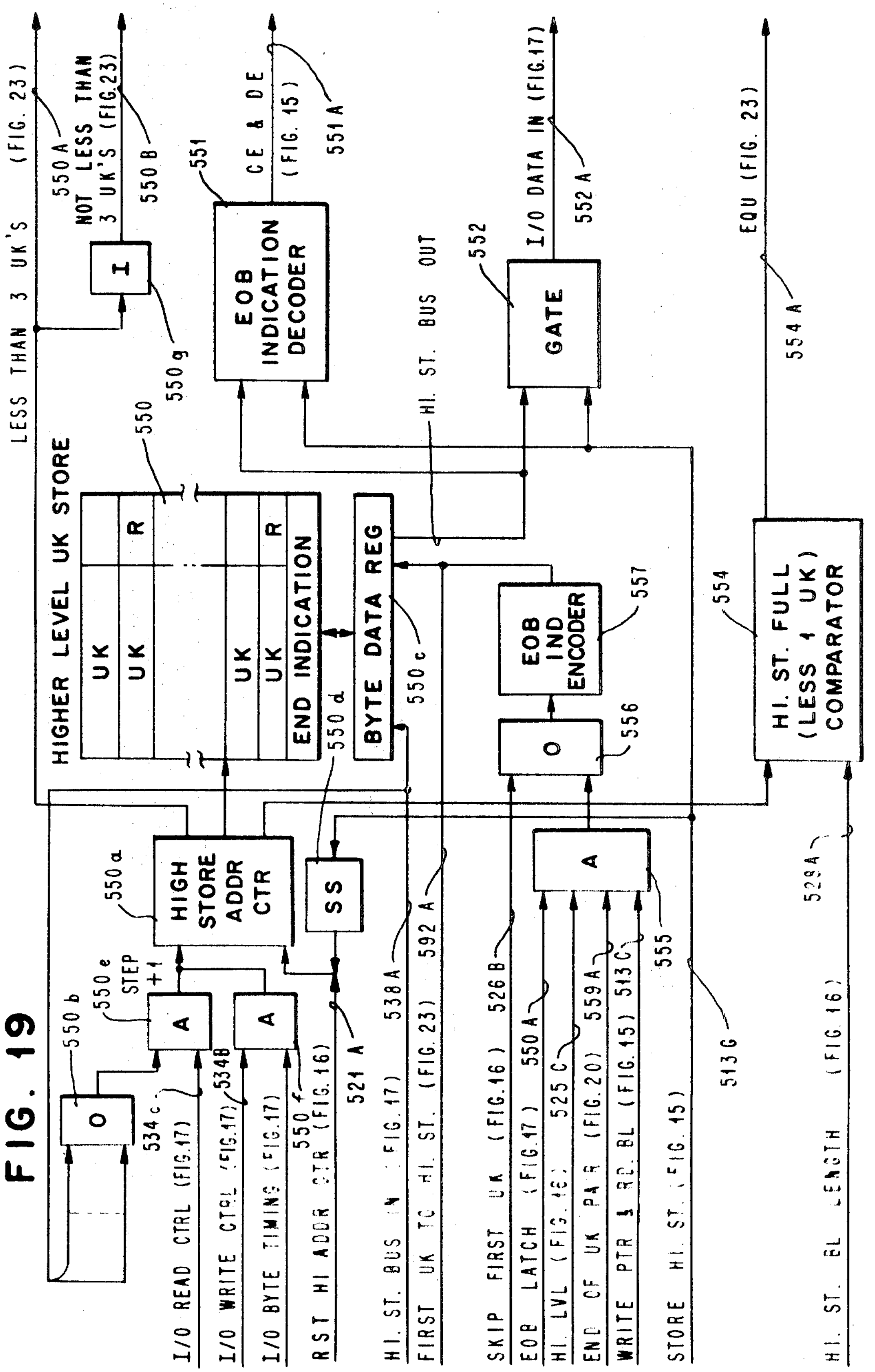
Figure 24C:
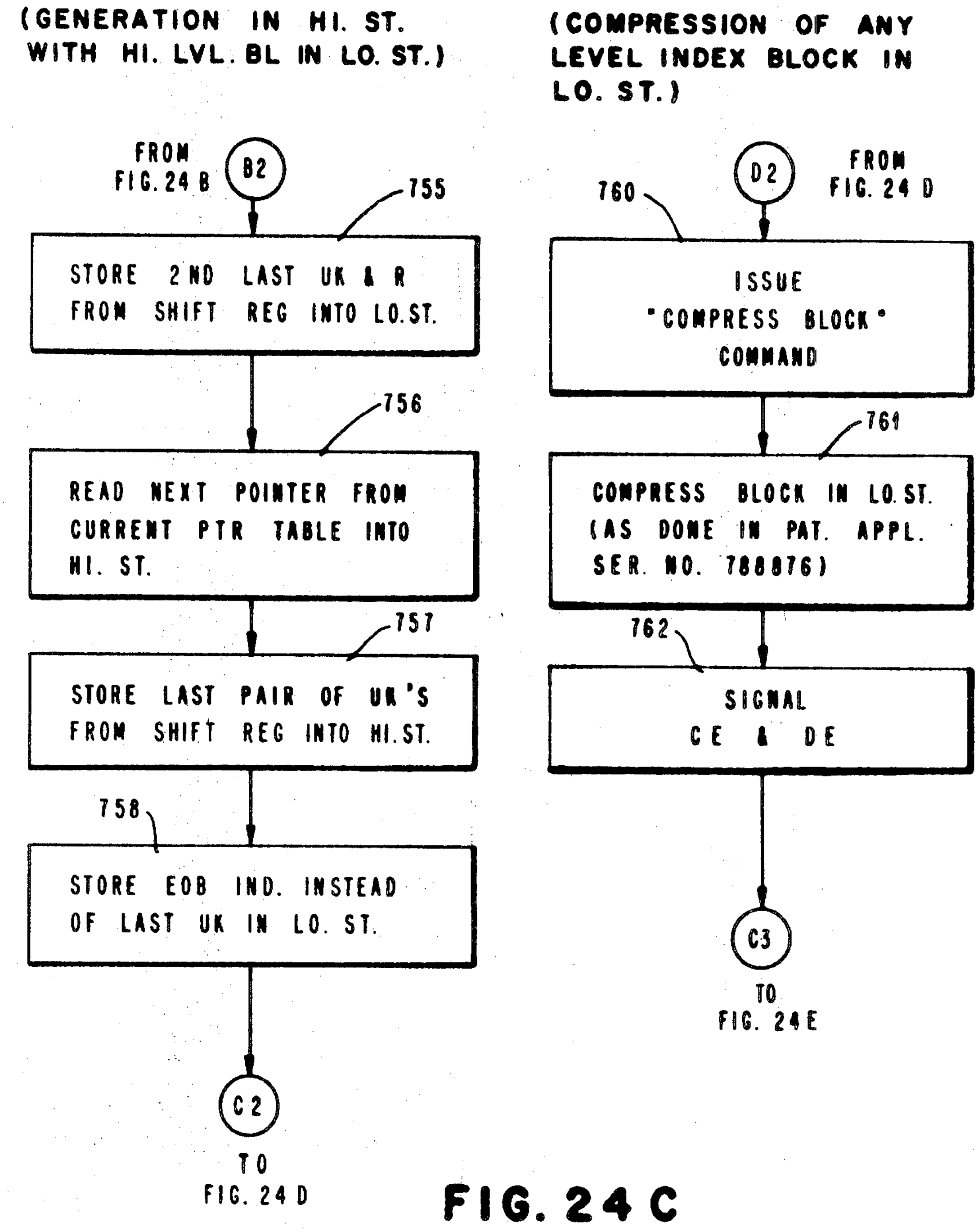
Figure 24D:
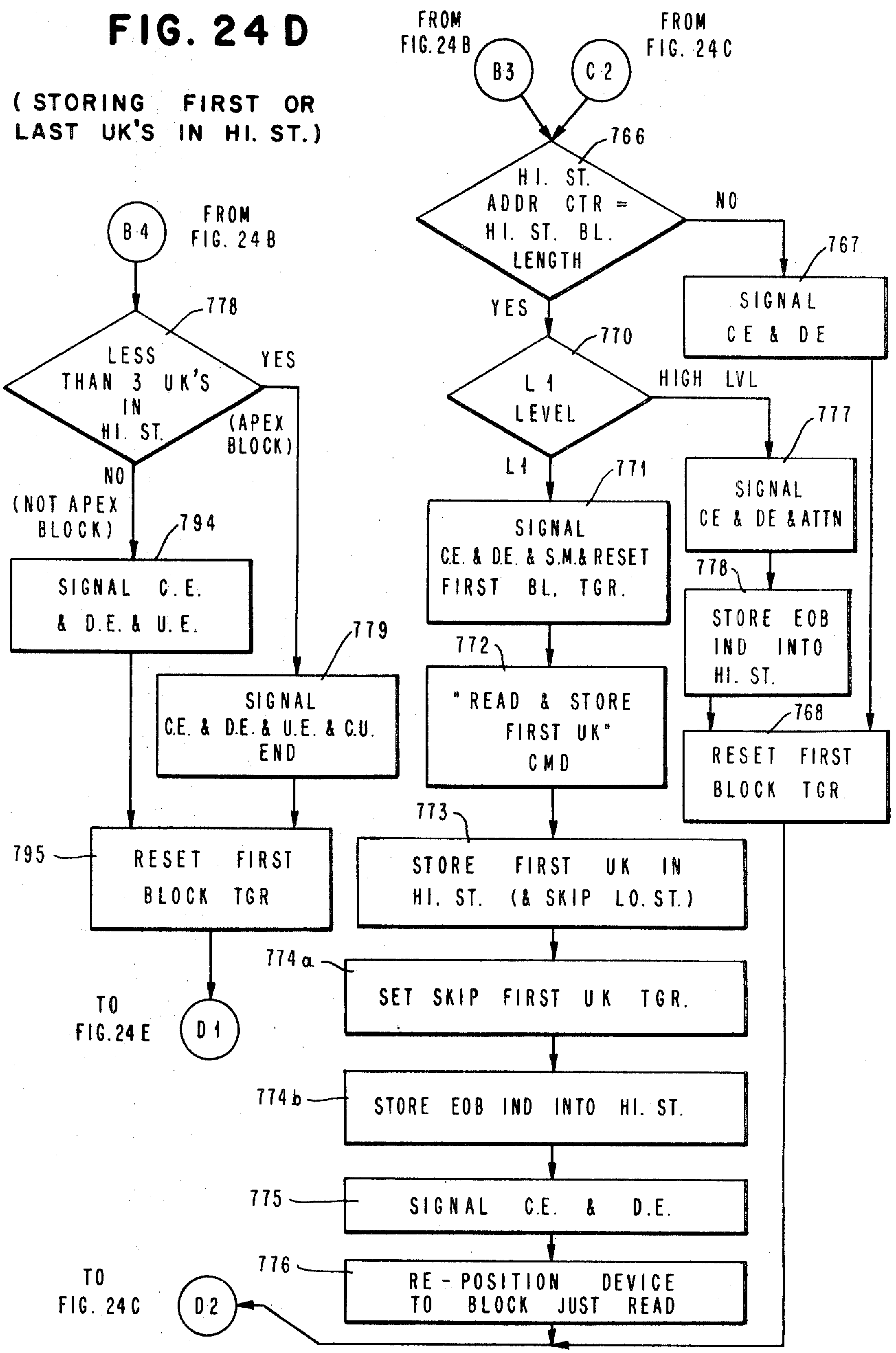

Exit B3 from FIG. 24B enters step 766 in FIG. 24D to determine if high store 550 is full. This is done by compare circuit 554 in FIG. 19 which compares the contents of the high store address counter 550*a* with the block length register 528 on FIG. 16. When they are equal, a signal is generated on line 554A which indicates that the higher level UK store 550 is full. As each UK is being read, comparator 554 in FIG. 19 is looking to see if high-level store 550 is almost full; it activates equal line 554A when the high store 550 contains the number of UK's set in register 528 in FIG. 16. Thus store 550 can receive at least one more UK when line 554A is active, otherwise not equal line 554B is active.

Initially high store 550 will not be full, and step 767 is entered to signal C.E. & D.E. via line 535A in FIG. 17. This signal simultaneously resets the first block trigger 526*a* in FIG. 16 to execute step 768 and pulses OR circuit 515C in FIG. 15, which signals the interface controls 512 and the CPU to issue the next command. Switching step D2 to FIG. 24C is then executed.

Step 760 in FIG. 24C is entered at D2, and it causes a "-Compress block" command to be issued as the next command from memory 510 in FIG. 14. This command is received by command decoder 513 FIG. 15 which activates line 513E that pulses single shot 540*a* to circuits 540 in FIG. 18.

Figure 2A:
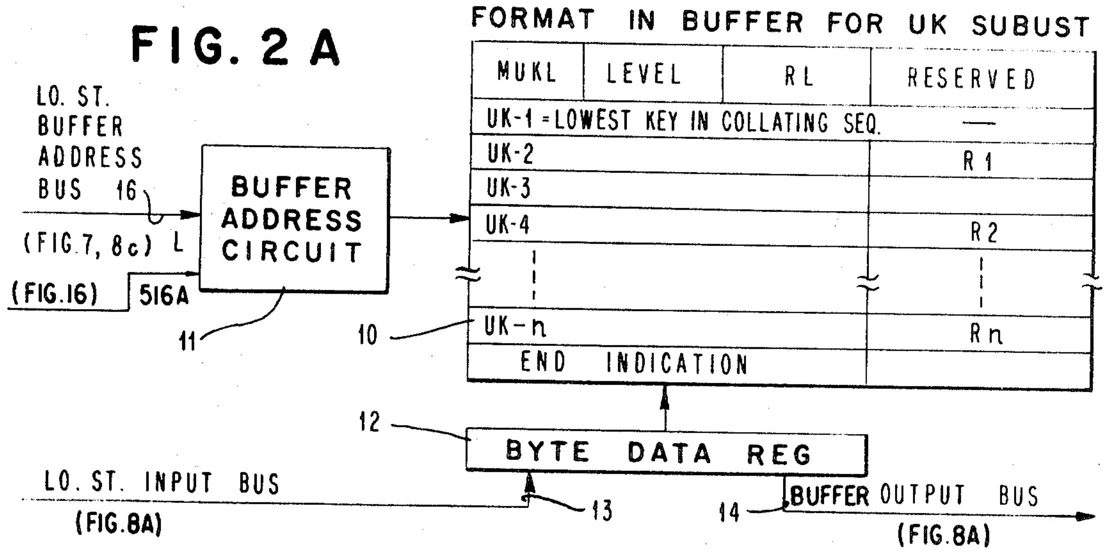
FIGS. 2A and 2B illustrate a buffer and input-output circuits used for storing an uncompressed high-level index and the resulting compressed index respectively.
Figure 2B:
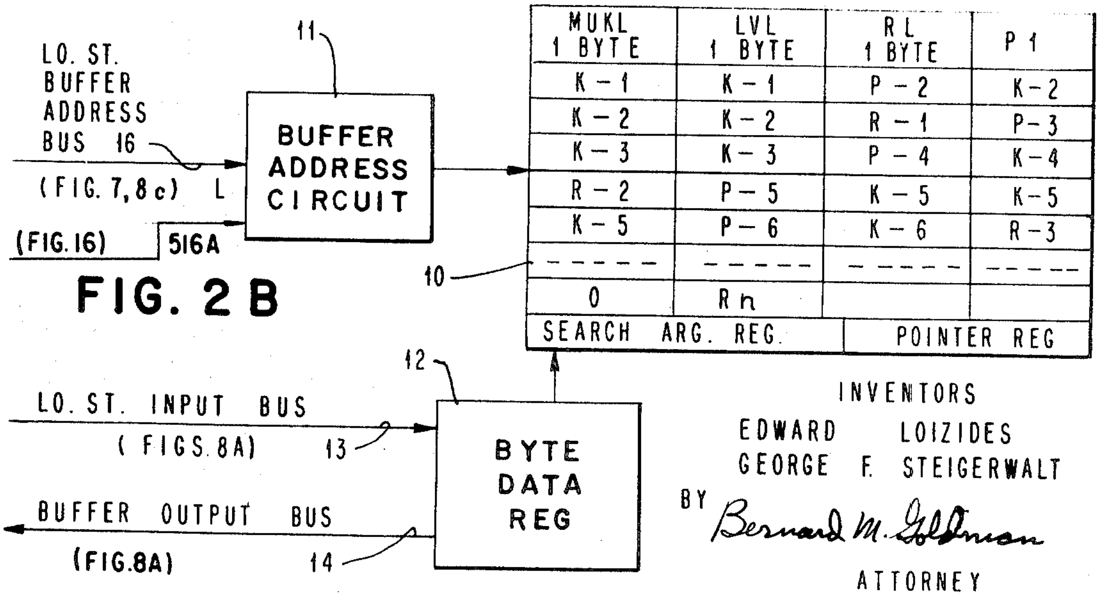

Step 761 is executed by circuits 540 which are represented by FIGS. 3, 6–8D. They are explained in detail with the same Figure numbers in previously cited patent application Ser. No. 788,876 with a few changes herein. The only significant change in FIGS. 3,6 through 8D is in FIG. 7 by the addition of circuits 801–805 which are used for compressing high-level blocks in low store 10 after they are transferred from an intermediate I/O store into low store 10, in order to obtain the high-level format shown in FIGS. 2B and 5B. This format skips alternate R positions in low store 10 during a key compression operation. FIGS. 2A and 2B illustrate the contents of store 10 at the beginning and at the end of the index compression by step 761.

Figure 18:
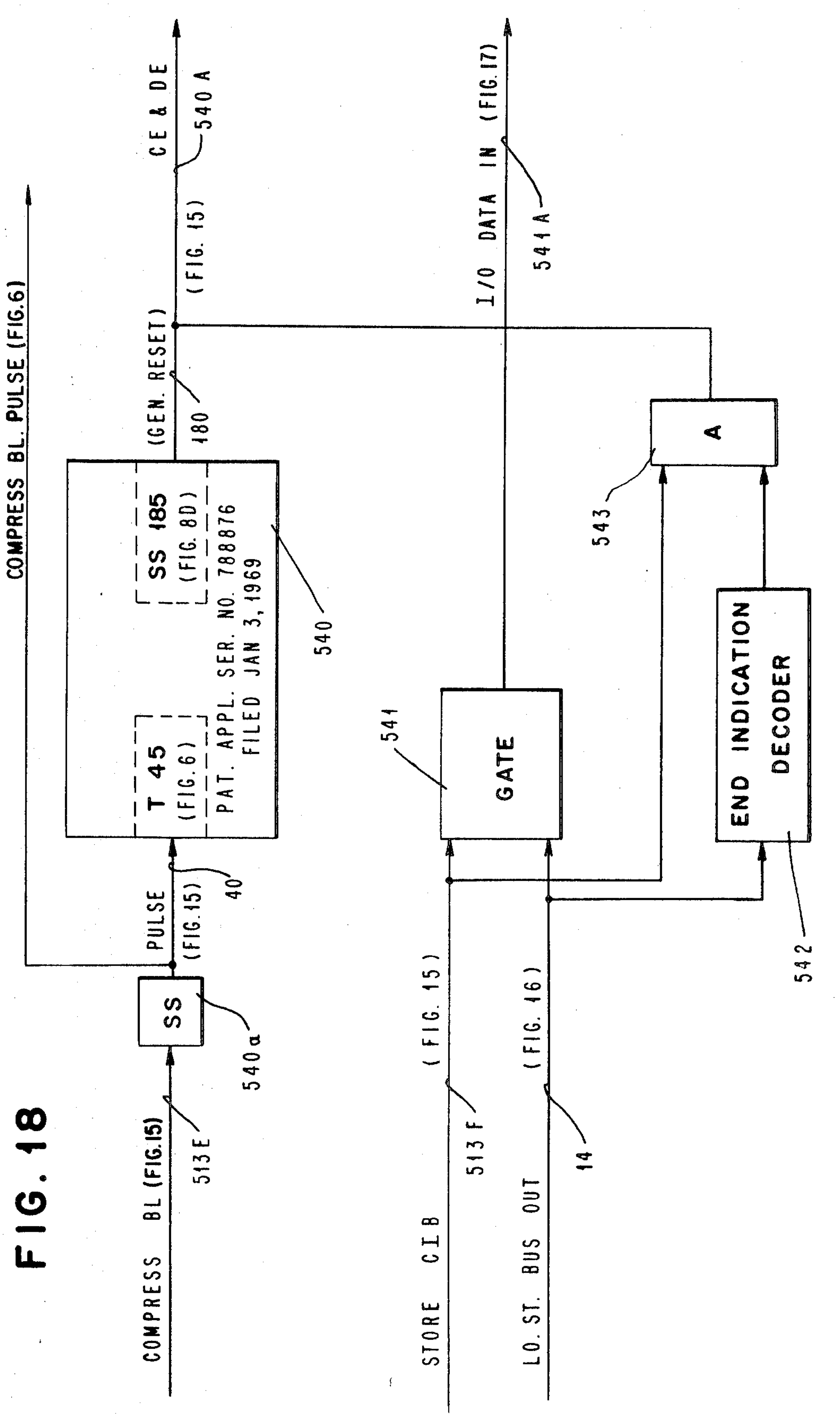

The internal block generation circuits in FIGS. 3, 6–8D start operating in response to a pulse on line 40 from single shot 540*a* in FIG. 18. A pulse from single shot 540*a* is used to start both low and high-level block compression in low store 10. For low-level operation, the circuits in FIGS. 3, 6 through 8D operate as explained in the previously cited application Ser. No. 788,876. For high-level operation they operate to provide the high-level format shown in FIG. 5B using the circuit changes disclosed herein. The level flag byte at the beginning of a block to low store 10 controls which format, low or highlevel, is chosen for operation. This byte in level register 117 in FIG. 7 performs this control.

The controlling output of level register 117 is provided to AND circuit 30 or 33C in FIG. 6. When the high-level output from register 117 conditions AND 30, the UK end signal on line 114A alternates the outputs of binary trigger 30*a* for the two UK's in each pair to control the high-level format. The outputs of binary trigger 30*a* distinguish between the first and second CK's in each pair associated with a single pointer. The initiation of the generation of the second key of each pair is indicated by activation of pulse former 34 and its output line 34A, which is provided to FIGS. 7 and 8D.

Figure 8A:
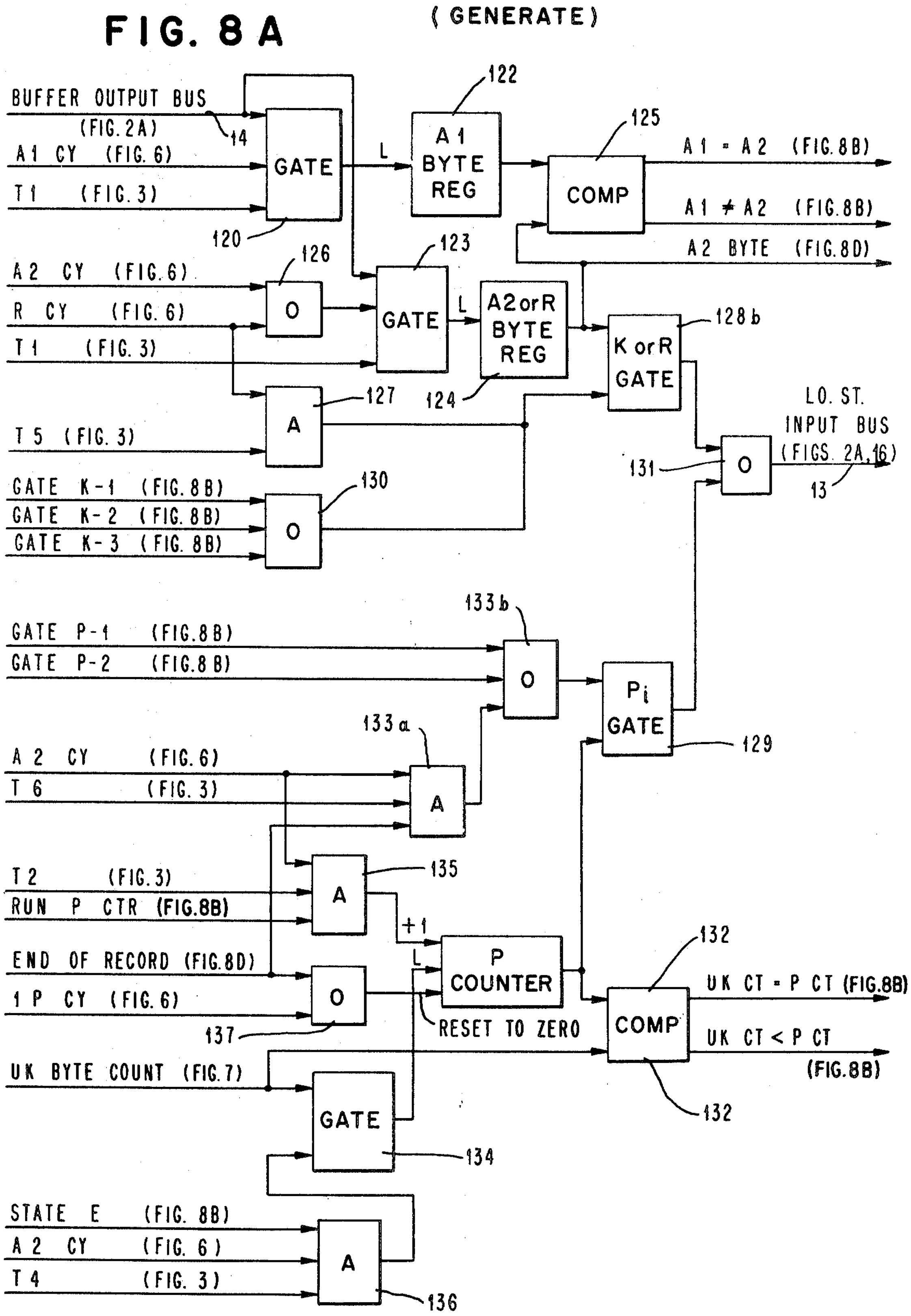
Figure 8C:
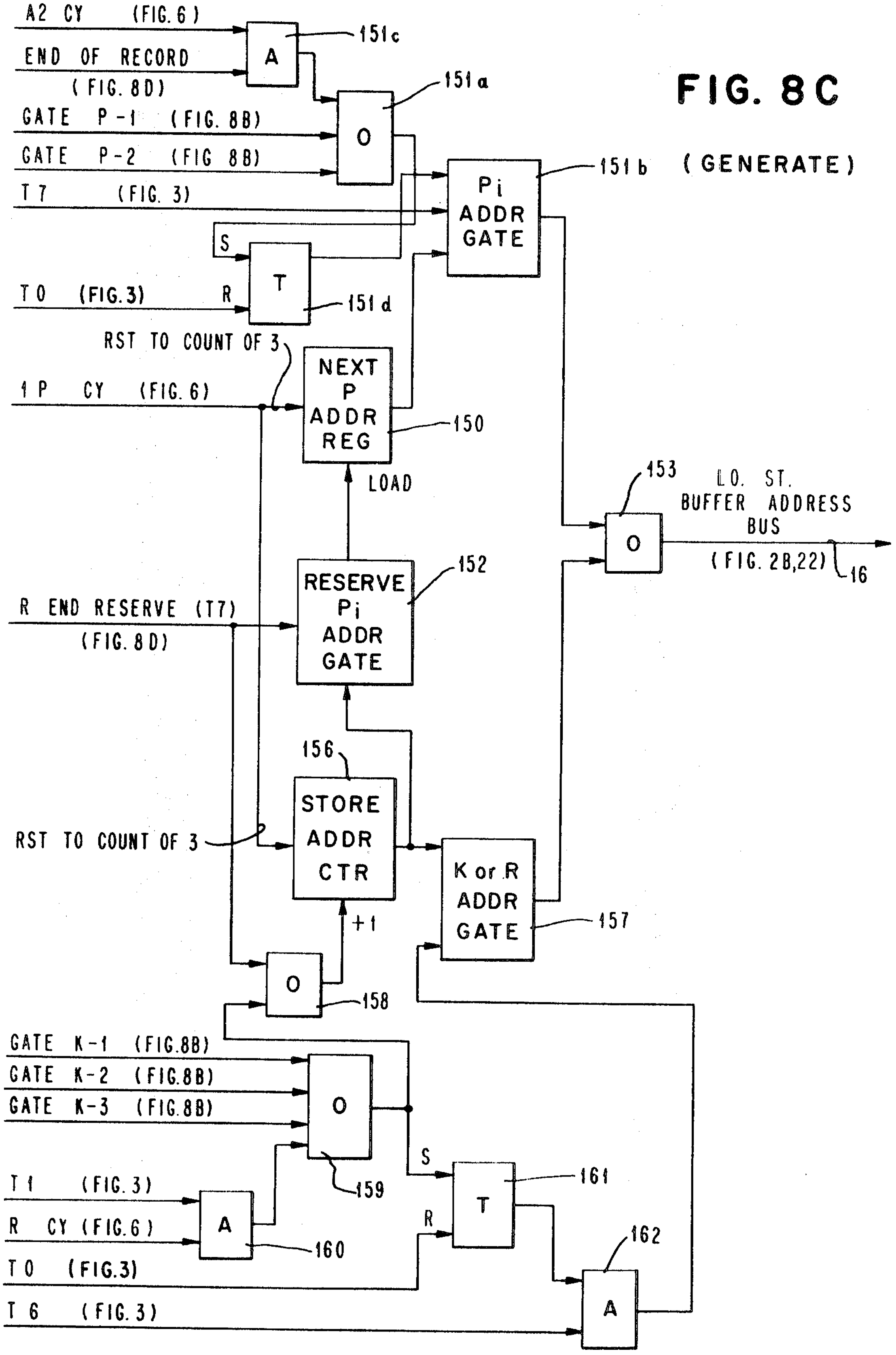

In FIG. 8D, line 34A actuates OR circuit 191*a* which then pulses pointer end reserve line 191A to gate 152 in FIG. 8C, which loads register 150 with the P value of the first CK of the pair, in preparation for generating the second CK of the pair.

Figure 7:
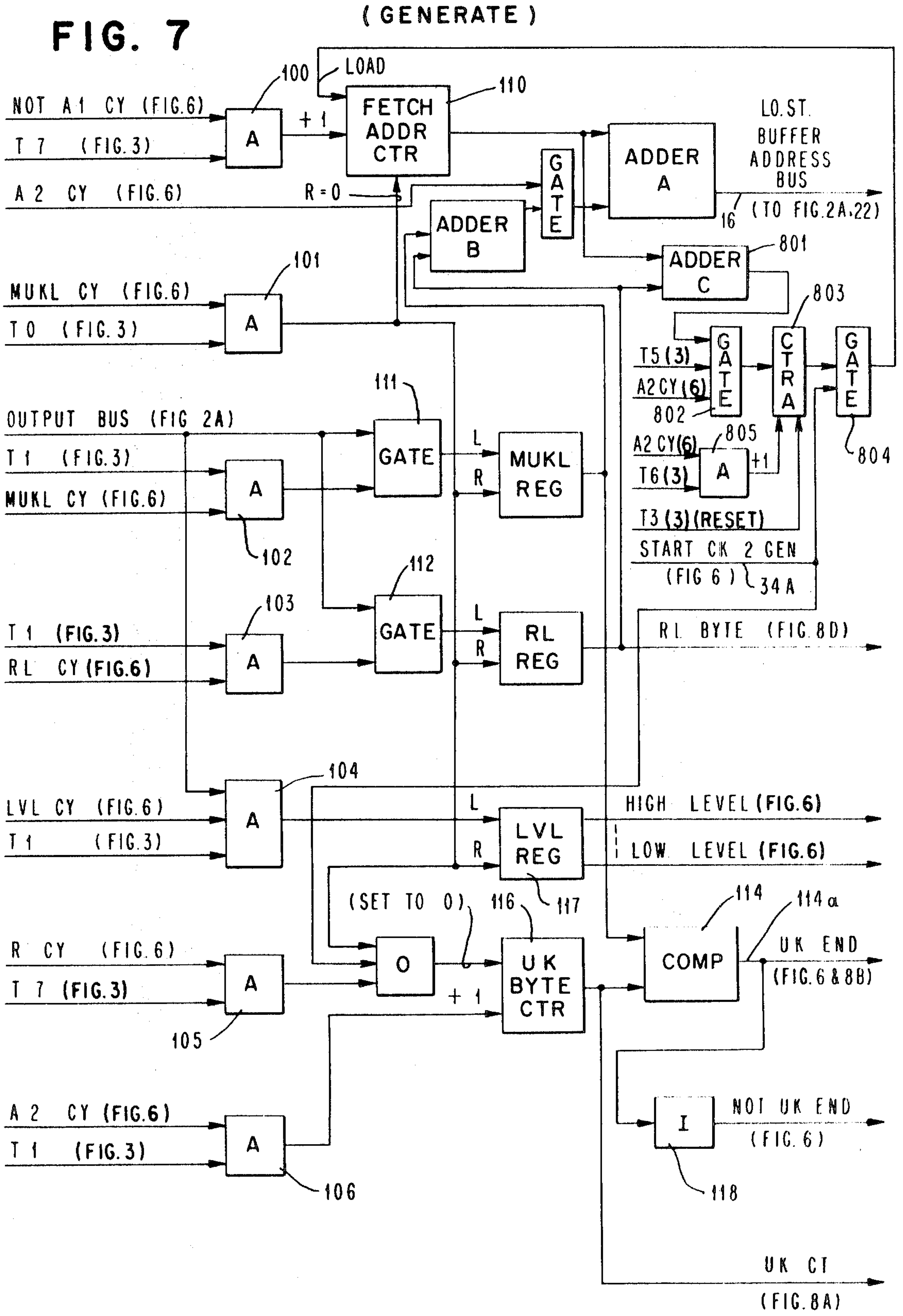
FIG. 7 shows buffer address and other controls used during compressed key generation for any level.

In FIG. 7, line 34A actuates circuits which cause a skipping of the pointer field in low store 10 following the first CK in each pair. Adder 801 incrementally adds the number of bytes in the skipped pointer field to the current address from counter 110 during each A2 clock cycle at T5 time, which is stepped by one at T6 during each A2 cycle to generate a corresponding address for the second CK in a pair. During each cycle, a counter 803 receives the incrementally added address, after counter 803 is reset at time T3. Then counter 803 is loaded from Adder 801 at T5.

However, this loaded address in counter 803 is not used until it is required, which occurs when the start CK–2 generation line 34A is activated from FIG. 6 to a gate 804 in FIG. 7 in response to activation of the Uk end line 114A. Gate 804 then loads the current setting of counter 803 into fetch address counter 110 in FIG. 7 as the starting address in low store 10 for the second CK of each pair.

At the end of generation of the second CK of each pair, AND 30 flips binary trigger 30*a* to actuate pulse former 31 that causes transfer of the pointer into low store 10, which is followed by generation of the first CK of the next pair, etc.

At the completion of step 761, step 762 is executed by the general reset signal in FIG. 8D from single shot 185, which provides a C.E. & D.E. signal to FIG. 15 which signals the CPU to fetch the next command. Switching step C3 to FIG. 24E, is executed.

Figure 24E:
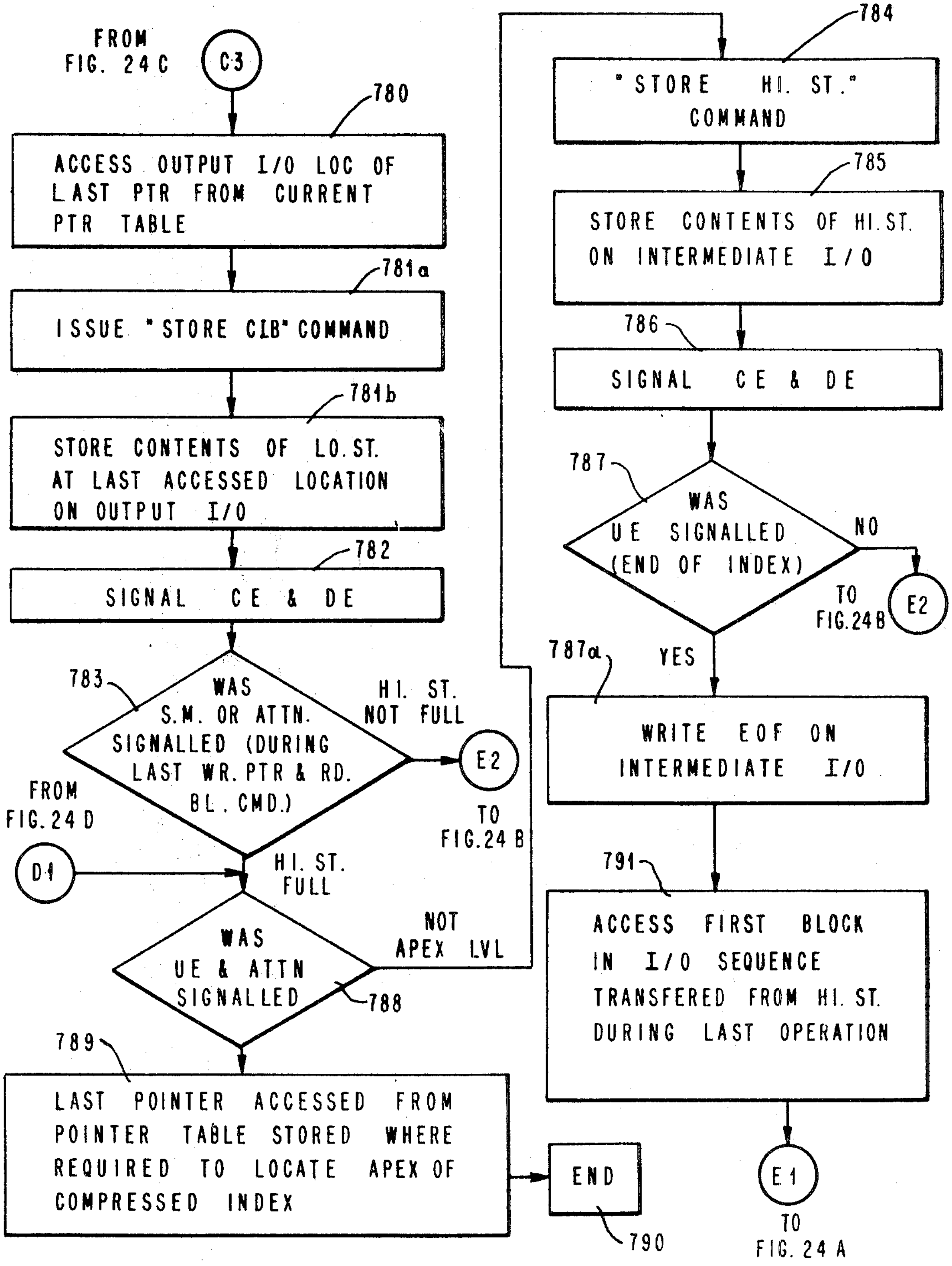

C3 in FIG. 24E enters step 780 which accesses the location on I/O device 530*c* that was designated by the last pointer transferred from the current pointer table to high store 550, as performed by step 752 in FIGS. 24B. This selection is done by the CPU activating line 512A to I/O controls 530 in FIG. 17.

Step 781*a* is executed when the CPU fetches the next command in the command table in memory 510 which is transmitted via bus 511A and interface controls 512 to command decoder 513. Step 781*b* is executed when this fetched "Store C.I.B. (compressed Index Block)" command activates its output line 513F to FIGS. 16, 17 and 18, which respectively resets the low store address counter 11*a* to the beginning of the block, sets the selected I/O 530C to write mode, and conditions gate 541 to transfer the compressed block from low store 10 to the last accessed location on output device 530*c*. This is done by having the I/O write timing line 530*k* from FIG. 17 drive the low-store address counter 11*a* and the low-store fetch controls, which causes the data in the low store to be read into byte data register 12 and passed therefrom via low-store bus out 14 through the conditioned gate 541 and to the I/O data in bus 541A in FIG. 18 to I/O controls 530 in FIG. 17, which passes the signals to device 530*c* which stores them at the accessed location.

Step 782 is executed when the end of block indication in store 10 is reached, it is decoded by and end indication decoder 542 in FIG. 18 which signals C.E. & D.E. on line 540A to FIG. 15. Then step 783 is entered to determine whether signals exist indicating if high store 550 is full.

If the high store is not full, exit E2 is taken to FIG. 24B; and step 742 is again entered. The following steps in FIG. 24B are therefore repeated in the manner previously explained, with the following differences: Step 745 may still find L1 in level register 525, with the current input block not being the first block of the L1 sequence. Hence first block trigger 526*a* is reset to execute step 746, and step 747 is entered which was skipped during the first input block. Step 747 causes the first UK into low store 10 to be also transmitted to high store 550, where it is not at the beginning of a high store block, as can be seen in TABLE A.

Step 747 is executed by the activation of the not skip first UK line 526A from AND 226*c* in FIG. 16, which is activated by both the first block trigger 226*a* and the skipped first UK trigger 226*b* being in reset state. AND 581*a* in FIG. 22 is conditioned by line 526A during L1, and is conditioned also by a first UK line 574A from trigger 573 in FIG. 21. Trigger 573 is set by AND 572 being conditioned by not EOB line 550B, read I/O line 534A, and end of UK pair line 559A. The latter line is provided from UK pair clock 559 in FIG. 20. This clock begins cycling in response to read I/O trigger 551 being set by the "write pointer and read block" command signal. Since clock 559 operates directly from the I/O signals, it goes through the complete cycle of two UK's and R's before the first UK is provided from shift register 531. Hence the signal on line 559A activates AND 572 to set first UK trigger 573 in FIG. 21 immediately before the first UK appears on the I/O data-shifted line 531A to gate 537 in FIG. 17. The signal on first UK line 573 activates AND 581*a* in FIG. 22, which causes the load UK line 580A to activate gate 537 to pass the first UK to high-store bus in line 538A and thereby complete the execution of step 747.

When the block being read is almost completed, steps 750–753 are executed in the same manner as previously explained, and exit B3 causes FIGS. 24D to be entered.

Step 766 then indicates whether the high-store block is full. Step 766 indicates high store 550 is full (less one UK) when comparator circuit 554 activates line 554A to AND 596 in FIG. 23, which has its other lines energized including line 525B which executes step 770. The output of AND 596 generates a status modifier (S.M.) signal on lead 596A to execute step 771, which is preparatory to inputting the last UK into high store 550 and completing the block generated therein.

A C.E. & D.E. signal is generated at the end of this and every other inputted block by line 535A from OR circuit 535 which receives an EOB to low store for low-level input signal on line 582A in response to the end of block latch being set. Hence step 771 includes this C.E. & D.E. signal which activates OR 515*c* in FIG. 15 to cause fetching of the next instruction; the S.M. signal to interface controls 512 with the C.E. & D.E. causes a "read and store first UK" command to be fetched next. This executes step 772.

The decoded command signal on line 513H actuates the next sequence of steps 773, 774 and 775 which cause the next input block to be read for the sole purpose of inputting its first UK into high store 550 as the last UK. The signal on line 513H is received by OR 534*a* in FIG. 17 to activate the read controls in I/O control 530, and by gate 592 in FIG. 23. Gate 592 transfers the first UK provided on the I/O data shift line to high store 550 on bus 592A in FIG. 19. The step 773 transmission of the first UK is completed as the first UK line 573A is deactivated in FIG. 21 when trigger 573 is reset via single shot 576 by trigger 575 being set by the equal on MUKL signal from compare circuit 554 in FIG. 20.

Step 774*a* is executed by AND circuit 593, single shot 594, and delay 595 in FIG. 23 to activate a set ship first UK trigger line 595A to FIG. 16 which sets trigger 526*b*.

Step 774*b* marks the end of the completely generated block in high store 550 during the L1 input sequence of blocks. Step 774*b* is entered when the skip first UK trigger 526*b* in FIG. 16 is set. Its output line 526B then activates an EOB indication encoder 557 in FIG. 19 which stores an end of block indication in high store 550 following the last pointer stored therein.

Step 775 is then executed as the C.E. & D.E. line 593A in FIG. 23 is activated at the end of the current input UK block by the signal C.E. and D.E. line from FIG. 23. This fetches the next command which backspaces the input record last read; this executes step 776.

Accordingly the next input block has been read and only the first UK has been transmitted from it to high store 550 as step D2 causes the method to go to FIG. 24C.

The steps 760–762 are then executed in the manner previously explained to compress the L1 block in low store 10. Then step C3 takes the method to FIG. 24E in which steps 780–782 are executed in the manner previously explained to store the last block compressed at the location designated by the last R fetched from the L1 pointer table.

Step 783 signals whether the block being generated in high store 550 became full during execution of the last "write pointer and read block" command. If it is not full the method exits at E2 to FIG. 24B to read the next input UK block. Otherwise, step 788 entered if the high store block is full. Step 783 is executed when the CPU had accepted signals from S.M.. trigger 597 or ATTN. trigger 590*b* in FIG. 23 on the last executed "write pointer and read block" command. Lack of a signal from either cause the CPU to fetch a "write pointer and read block" command for executing step 742 in FIG. 24B. If either trigger is set the CPI next executes step 788 by examining if it received signals from both U.E. trigger 591*b* and ATTN. trigger 590*b* to determine if the last intermediate stored compressed block is the Apex block, which decision is made by actuation of AND 591 in FIG. 23.

During steps 783, 788 and a following step 787, the examined states of triggers 597, 590*b*, and 591*b* is determined during execution of the last "write pointer and read block" command. AND circuit 596 sets trigger 597 when the high store 550 is full and a low-level block is in low store 10 before the end of the current I/O input file has been reached. Trigger 590*b* is set via OR 590*a* by either AND 590 or 591. Also trigger 591*b* is set via OR 591*a* by activation of either AND circuit 591 or 599. AND circuit 590 is activated when high store 550 is full and a high-level block is in low store 10 which is not the end of the current I/O input file. AND circuit 590 is activated whenever the end of a single block apex file has been read into low store 10 from an intermediate I/O. AND circuit 599 is activated at the end of file of any nonapex input. The triggers 597, 590*b*, 591*b* are reset when the CPU signals status accepted on line 512D in FIG. 15 in response to its acceptance of the C.E. & D.E., S.M., ATTN., and/or U.E. signals. Accordingly these signals are dropped before issuance of the "-store CIB" command by step 781*a* in FIG. 24E, therefore the S.M., ATTN. and U.E. signals must be received and stored by the CPU 511 for the later execution of steps 783, 788 and 787 in FIG. 24E. (The acceptance and storage of interface signals by a CPU and its response by issuance of a command is standard operation in current commercial computers, and hence is not shown or explained in detail herein.)

If the apex level was indicated by step 789, the last pointer transferred to high store 550 by step 742 in FIG. 24B from the current pointer table in FIG. 14C, and used by step 780 in FIG. 24E, is stored by the CPU so that this pointer can later be used for entering the newly generated compressed index (stored on I/O devices 530C) for a search operation.

Step 784 is entered if step 788 does not find both U.E. and ATTN. had been signalled, since the current input level is therefore not the apex level. The CPU responds by issuing the "store high store" command as its next command.

Then step 785 is entered by activation of output line 513G from the command decoder in FIG. 15; this causes the contents of high store to be written onto the intermediate I/O device 530*b* . Line 513G in FIG. 19 resets the high-store address counter 550*a*, which is then stepped by I/O write-timing line 530*k* in FIG. 17 as the contents of high store 550 are read out through gate 552 via the I/O data in lines to I/O controls 530, which writes the block upon intermediate I/O device 530*b*. When the end of block indication is sensed by EOB indication decoder 551, a C.E. & D.E. signal is provided on line 551A to interface controls 512 to execute step 786.

Then step 787 acts to indicate whether the end of the input I/O sequence has been reached by the sensing of a U.E. signal by an end of index record. If the end of index record has not been reached (i.e. no U.E. signal was generated by the last "-write pointer and read block" command execution), then exit E2 is taken to FIG. 24B which causes the next block to be read from the I/O device to continue the processing of the same input sequence.

However if step 787 finds that U.E. was signaled, step 789 writes an end of file record on intermediate I/O device 530*b*. The end of file step is signalled by line 530E in FIG. 17 when the last block in the input sequence is an end of record block. This is done by means found in current commercial computer systems. For example, commercial tape controls have long been signalling U.E. when a tape mark block indicates end of file. The U.E. has long been used by commercial computer to actuate hardware in tape controls which write a tape mark record at the end of the output file. This is the meaning of line 512E in FIG. 17 feeding back into I/O control 530, which causes a tape mark record to be written at the end of the sequence of blocks written on intermediate device 530*b* after and in response to the EOF tape mark record is sensed on the input I/O device 530*a*. An EOF record is sensed by step 744 in FIG. 24B, which exits at B4 to step 788 in FIG. 24E to bypass all steps which would not be appropriate when an EOF record is sensed.

Then step 791 is entered to access the beginning of the intermediate I/O block sequence written from high store 550 during the preceding operation. Exit E3 is taken to FIG. 24A to enter step 712 which causes issuance of a "write initial" command, which begins the method with the next higher level UK sequence being inputted. Accordingly the steps 712–733 in FIG. 24A are executed as previously described, ans the steps 740–743 in FIG. 24B are executed as previously described. However when step 745 is reached, high level is found in register 525; and accordingly step 745 exits at B2 to FIG. 24C.

In FIG. 24A, step 716 operates differently when the method is entered by E3 rather than by start 710. Entrance E3 is used during all high-level operations for the initial loading of the low store by the CPU; while start step 710 is used only during the low-level initial loading of the low store by the CPU. Thus when step 716 accesses the next current level control table, it must always be a high-level control table after accessing the initial control table for level L1. Each of the high-level control tables have additional entries for a zero UK and a zero R, for example see the L2 level control table in FIG. 14B. Thus when the CPU transfer occurs in response to the write initial command, all of the items in the L2 control table are transmitted to the low store 10, except the block length item at the end of the table. The end of the transfer is determined by the count in the write initial command which ends the operation after the zero bytes for the R-field are transferred. The low-store address counter is stepped accordingly so that these bytes are placed where required in low store.

When B2 enters step 755 in FIG. 24C, the read operation inaugurated by step 743 in FIG. 24B has progressed to the end of the input block on I/O device 530*b* where an end of block signal has set trigger 530*d* in FIG. 17. This point in time finds the second last UK and R in shift register position 531*b*, and the last UK and R in shift register position 531*a*. The UK pair of clock 559, FIG. 20, is used to define the last pair of UK's and R's, and its circuitry operates in the manner previously described to activate AND circuit 551*c*, 556 557 and 558 in FIG. 20 as previously described.

Step 755 is executed when the second last UK and its pointer are transferred from shift register 531 to low store 10 in FIG. 16 through gate 532 and OR 533 in FIG. 17.

Step 756 executes the "write pointer" part of the command issued by step 742 in FIG. 24B by transmitting the next pointer from the table accessed by step 741 to bus out line 511B, which inputs it through gate 536 with the timing of line 584 from OR circuit 584 in FIG. 22. For high-level inputs to low store 10, line 584A is timed by AND 584*b* with the second-last R signal from AND 556 in FIG. 20.

Step 757 is executed concurrently with steps 755, 756 and 758. Step 757 stores the last pair of UK's during signals on FIG. 20 lines 551A and 557A to FIG. 22 AND circuit 581*b* and OR circuit 580, respectively. Or circuit 580 activates line 580A to FIG. 17 gate 573, which causes the last pair of UK's to be gated respectively into high store 550 as the UK signals are shifted out of register 531 under actuation of oscillator 530*e*.

Step 758 is executed when AND circuit 581*c* in FIG. 22 is activated by the last UK line 557 557A to provide a signal on line 581C to OR circuit 535*a* in FIG. 17. It actuates EOB indication encoder 535*b* to store the EOB indication in low store 10. The last UK can not be transmitted to low store 10 in FIG. 16 because line 581A is deactivated during the last UK to inhibit gate 532 in FIG. 17. The inhibit last UK line 581A provides the inverted output of AND circuit 581*c* and is activated except during the last UK being inputted.

Then exit C2 is taken to FIG. 24D to determine if the high-store block is full.

Then step 766 in FIG. 24D is entered which is executed as previously explained. If the high-store block is full, step 770 is entered, and during high-level inputting, it exits into step 777 to signal ATTN. on the current "write pointer and read block" command. The ATTN. signal is provided from AND circuit 590 to trigger 590*b* in FIG. 23 to indicate (1) that the high-level block is full, (2) that a high-level block was inputted into low store, and (3) that the block in low store 10 is not the last block of the current high-level input sequence.

Step 778 stores an END of block indication into high store 550 during the timing by the signal on the end of UK pair line 559A to AND circuit 555 in FIG. 19 while the EOB latch 550 is set in FIG. 17 during high-level inputting. The output of AND 555 actuates EOB indication encoder 557 to store the indication at the end of the block in high store 550.

Then step 768 resets the first block trigger in response to the C.E. & D.E. signal of step 777, which is provided from line 535A in FIG. 17. Exit D2 is then taken to FIG. 24C to compress the block in low store 10, which was previously explained.

What we claim is:

1. A method of generating index entries for a high level of multilevel compressed index, including the steps of machine assembling a plurality of boundary pairs of uncompressed keys, each boundary pair being a last and a first uncompressed key in two sequenced groups of uncompressed keys used in the generation of two sequential index blocks at the lowest level of said compressed index, said machine assembling step providing a sequenced high-level group of uncompressed keys, machine assigning pointers to each of said uncompressed key pairs, said pointers representing addresses of compresses index blocks in said lowest level, machine compressing said uncompressed keys in sequence into compressed keys, and machine generating index entries for said high level by a relational positioning of said pointers with respective pairs of said compressed keys provided by said machine compressing step.

2. A method as defined in claim 1 for generating the high-level index, including the steps of machine grouping said boundary pairs of said uncompressed keys and pointers into a sequence of groups, and activating said machine compressing and machine generating steps to convert said groups into respective high-level compressed index blocks, whereby said high-level compressed index blocks provide a high index level.

3. A method of generating a high-level compressed index as defined in claim 1, further including the steps of said machine compressing step simulating a null uncompressed key as the first uncompressed key in said sequenced high-level group of uncompressed keys, and machine blocking said high-level index entries into high-level blocks as provided by said machine generating step, whereby an independent search characteristic is generated for each high-level block.

4. A method as defined in claim 3 further including the step of machine transferring each of said high-level blocks to a recording medium in their generated order at preassigned locations, whereby each address representation of said preassigned locations is a pointer for an entry in a next higher level of said index.

5. A method as defined in claim 3, in which said machine blocking step includes, machine counting not more than a predetermined number of said high-level index entries to comprise any single compressed index block.

6. A method as defined in claim 3, in which said machine blocking step includes machine completing each compressed index block whenever a next index entry can exceed a predetermined number of bytes for generating each compressed index block, or when no more index entries are being provided by said machine generating step.

7. A method as defined in claim 2, in which said machine compressing step further includes machine formating a last compressed key for a last index entry in each high-level compressed index block with a special format different from a format used for other compressed keys in the same block.

8. A method as defined in claim 7, in which said machine formating step further includes machine inserting a predetermined byte as the last compressed key in the last index entry for ending each index block.

9. A method as defined in claim 6, further including the step of machine ending the generation of each high level in the multilevel compressed index before generating a next higher index level.

10. A method as defined in claim 3, for generating a next higher level in said compressed index, including the following steps machine collecting each last pair of uncompressed keys used in the generation of each said high-level block in sorted sequence to provide a machine collection of uncompressed keys, also machine assigning pointers to each said last pair of uncompressed keys, each of said pointers representing the address of a high-level index block for which said last pair was used by said machine generating step, and reiterating said machine compressing step and said machine generating step to generate index entries for the next higher level.

11. A method as defined in claim 8, further including the step of machine blocking the index entries to generate index blocks for the next higher index level, after said reiterating step has generated index entries in a number to fill a predetermined block size.

12. A method of generating a multilevel compressed index from a sorted input sequence of uncompressed keys with respective pointers to related data blocks for providing an uncompressed index for a set of data blocks, having the steps of machine grouping said uncompressed keys and related pointers into a plurality of sequenced groups, machine comparing each adjacent pair of uncompressed keys in each sequenced group, machine compressing said adjacent uncompressed keys into compressed keys for a low-index level, and machine positioning with each compressed key a pointer to a data block related to a first uncompressed key of each adjacent pair of uncompressed keys acted upon by said machine compressing step, each compressed key and its pointer comprising a low-level entry, machine collecting each low-level entry generated from each group of uncompressed keys to build each compressed index block for a lowest level of said compressed index, machine reiterating said machine comparing, machine compressing, and machine collecting steps for each sequential group to build a sequence of compressed index blocks comprising the lowest index level, machine storing each compressed index block in said lowest index level at an assigned address in a machine-addressable storage entity, and providing a boundary pair pointer to represent each assigned address, machine assembling the last uncompressed key in each group and the first uncompressed key in the next sequential group, each said last and first uncompressed keys comprising a boundary pair of uncompressed keys, machine assigning a boundary pair pointer to each said boundary pair, of uncompressed keys, each boundary pair pointer representing the assigned address of a related lowest-level compressed index block for which said last uncompressed key of said boundary pair is a last uncompressed key in the group used by said machine-collecting step to generate the related lowest level compressed index block, machine storing each boundary pair of uncompressed keys and their boundary pair pointers in sequence to form one or more sets of boundary pairs and pointers, machine compressing each set of uncompressed keys in sequence into compressed keys for said high level, and machine recording pairs of said compressed keys for said high level with related boundary pair pointers in the sequence in which they are made available by said machine compressing step in generating compressed keys for said high level, whereby a second compressed key in each pair is generated from a comparison of the uncompressed keys within a single boundary pair.

13. A method of generating a high level for a compressed index as defined in claim 12, further including the steps of machine sensing the last pair of uncompressed keys in each set used in the generation of each compressed index block at said high level, next machine assembling each last pair of uncompressed keys in the sequence provided by said machine sensing step, and machine repeating said machine assigning, last-mentioned machine compressing, and machine recording steps to generate each entry for a still higher level in said compressed index.

14. A method of generating each still higher level for a compressed index using the method defined in claim 13, further including the steps of machine indicating the end of generation for each index level and providing an end-of-index signal for each high level being generated, machine repeating the prior-named steps used in generating any high level for generating a next high level, and machine terminating each current level generated for said compressed index in response to said end-of-index signal, and continuing the generation of the next higher level.

15. A method of generating a multilevel compressed index using the method defined in claim 14, comprising machine counting the number of levels in the compressed index currently generated, machine signalling when said machine counting step indicates a predetermined number of levels upon an occurrence of said end-of-index signal, and, machine terminating the generation of said multilevel index in response to an indication by said machine signalling step whereby a last generated level is an apex level for the multilevel index.

16. A method of generating a multilevel compressed index as defined in claim 14, including the steps of machine signalling a continuing signal that generation should start for a next higher level when plural index blocks are generated at any current level upon activation of said machine terminating step for said current level, machine generating a next higher level in said compressed multilevel index in response to said continuing signal, and machine ending the compressed index generating upon said machine signalling step signalling the existence of only one block at the next higher level, whereby a last index block completed at the execution of said machine ending step is an apex compressed block of the multilevel compressed index.

17. A method of generating a multilevel index as defined in claim 16, including the step of machine storing a pointer to said last index block in a predetermined location for future accessing of the multilevel compressed index.

18. A method of generating each high level of a compressed index comprising the steps of machine assembling a sequence of boundary pairs of uncompressed keys used in the generation of a plurality of blocks in a next lower level of the compressed index, machine assigning a respective pointer to each of said boundary pairs, said pointer being related to the address of a related one of the blocks in the next lower level, machine grouping said boundary pairs and said respective pointers in sequence for the generation of index blocks in said high level, machine recognizing a null condition as the first uncompressed key in the sequence of boundary pairs, and machine storing a plurality of groupings of said boundary pairs of uncompressed keys in preparation for the generation of a high level of said index.

19. A method of generating a high level of a compressed index including the steps in claim 18, and including the following steps:

machine reading the groupings of uncompressed keys in the sequence stored by said machine storing step, machine compressing the uncompressed keys in each grouping to provide compressed keys, machine recording said compressed keys in sequential pairs with a related one of said pointers to provide each compressed index entry for said high level, machine blocking said entries in their generated sequence for each group of uncompressed keys to generate each high-level block, and machine repeating the preceding steps for each group for said high level until an end is reached for the groups of compressed keys provided by said machine reading step, whereby the end of the index at said high level is reached upon said machine compressing step reaching the end of the uncompressed keys provided by said machine reading step.

20. A method for generating a next higher level in a multilevel index, including the steps defined in claim 19, and further including machine reiterating the steps of machine assembling boundary pairs, machine-assigning pointers, machine grouping of boundary pairs, machine storing a plurality of groupings, machine reading the groupings, machine compressing the groupings, machine recording the compressed index entries, and machine blocking the entries until the next higher level is completed.

21. A method for generating a multilevel index including the steps in claim 20, and the additional step of ending the construction of said index as soon as any high-level compressed index is completed with a single index block.

22. A system of generating index entries for a high level of a multilevel compressed index, including means for machine assembling a plurality of boundary pairs of uncompressed keys, each boundary pair being a last and a first uncompressed key in two sequenced groups of uncompressed keys used in the generation of two sequential index blocks at the lowest level of said compressed index, said machine assembling means providing a sequenced high-level group of uncompressed keys, means for machine assigning pointers to each of said uncompressed key pairs, said pointers representing addresses of compressed index blocks in said lowest level, means for machine compressing said uncompressed keys in sequence into compressed keys, and means for machine generating index entries for said high level by a relational positioning of said pointers with respective pairs of said compressed keys provided by said machine compressing means.

23. A system as defined in claim 22 for generating the high-level index, including means for machine grouping said boundary pairs of said uncompressed keys and pointers into a sequence of groups, and said machine compressing means and said machine generating means receiving said groups and generating respective high-level compressed blocks, whereby said high-level blocks provide a high index level.

24. A system of generating a high-level compressed index as defined in claim 22, further including said machine compressing means simulating a null uncompressed key as the first uncompressed key in said sequenced high-level group of uncompressed keys, and machine blocking means positioning said high-level index entries into high-level blocks as said entries are provided by said machine-generating means, whereby an independent search characteristic is generated for each high-level block.

25. A system as defined in claim 24, further including means for machine transferring each of said high-level blocks to a recording medium in their generated order at preassigned locations, whereby address representations of said preassigned locations provide pointers for entries in a next higher level of said index.

26. A system as defined in claim 24, in which said machine blocking means includes, means for machine counting not more than a predetermined number of said high-level index entries to comprise any single compressed index block.

27. A system as defined in claim 24, in which said machine blocking means includes means for machine completing each compressed index block whenever a next index entry can exceed a predetermined number of bytes for generating each compressed index block, or when no more index entries are being provided by said machine generating means.

28. A system as defined in claim 23, in which said machine compressing means includes means for machine formating a last compressed key for a last index entry in each high-level compressed index block with a special format different from a format used for other compressed keys in the same block.

29. A system as defined in claim 28, in which said machine formating means further includes means for machine inserting a predetermined byte as the last compressed key in the last index entry for ending each index block.

30. A system as defined in claim 27, further including means for machine ending the generation of each high level in the multilevel compressed index before generating a next higher index level.

31. A system as defined in claim 24, for generating a next higher level in said compressed index, including means for machine collecting each last pair of uncompressed keys used in the generation of each said high-level block in sorted sequence to provide a machine collection of uncompressed keys, means for machine assigning other pointers to each said last pair of uncompressed keys, each of said other pointers representing the address of a high-level index block for which said last pair was used by said machine generating means, and said machine compressing means and said machine generating means being actuated to generate index entries for the next higher level.

32. A system as defined in claim 30, in which said machine blocking means generates index blocks for the next higher index level by sequentially controlling the index entries by means of a predetermined block size.

33. A system of generating a multilevel compressed index from a sorted input sequence of uncompressed keys with respective pointers to related data blocks for providing an uncompressed index for a set of data blocks, comprising means for machine grouping said uncompressed keys and related pointers into a plurality of sequenced groups, means for machine comparing each adjacent pair of uncompressed keys in each sequenced group, means for machine compressing said adjacent uncompressed keys into compressed keys for a low index level, and means for machine positioning with each compressed key a pointer to a data block related to a first uncompressed key of each adjacent pair of uncompressed keys acted upon by said machine compressing means, each compressed key and its pointer comprising a low-level entry, means for machine collecting each low-level entry generated from each group of uncompressed keys to build each compressed index block for a lowest level of said compressed index; and means for activating said machine comparing means, said machine compressing means, and said machine collecting means for each sequential group to build a sequence of compressed index blocks comprising the lowest index level, means for machine storing each compressed index block in said lowest index level at an assigned address in a machine-addressable storage entity, and providing a boundary pair pointer to represent each assigned address, means for machine assembling the last uncompressed key in each group and the first uncompressed key in the next sequential group, each said last and first uncompressed keys comprising a boundary pair of uncompressed keys, means for machine assigning a boundary pair pointer to each said boundary pair of uncompressed keys, each boundary pair pointer representing the assigned address of a related lowest level compressed index block for which said last uncompressed key of said boundary pair is a last uncompressed key in the group used by said machine collecting means to generate the related lowest level compressed index block, means for machine storing each boundary pair of uncompressed keys and their boundary pair pointers in sequence to form one or more sets of boundary pairs and pointers, means for machine compressing each set of uncompressed keys in sequence into compressed keys for said high level, and means for machine recording pairs of said compressed keys for said high level with related boundary pair pointers in the sequence in which they are made available by said machine compressing means in generating compressed keys for said high level, whereby a second compressed key in each pair is generated from a comparison of the uncompressed keys within a single boundary pair.

34. A system of generating a high level for a compressed index as defined in claim 33, including means for machine sensing the last pair of uncompressed keys in each set used in the generation of each compressed index block at said high level, means for machine assembling each last pair of uncompressed keys in the sequence provided by said machine sensing means, and means for actuating said assigning means, said last-mentioned machine compressing means, and said machine recording means to generate each entry for a still higher level in said compressed index.

35. A system of generating each still higher level for a compressed index, including the means defined in claim 34, further including means for machine indicating the end of generation for each index level and providing an end-of-index signal for each high level being generated, means for terminating each current level of said compressed index in response to said end-of-index signal, and means for actuating the prior-named means used in generating each prior high level for generating a next high level.

36. A system of generating a multilevel compressed index using the means defined in claim 35, further comprising means for machine counting the number of levels in the compressed index currently generated, means for machine signalling when said machine counting step indicates a predetermined number of levels upon an occurrence of said end-of-index signal, and means for machine terminating the generation of said multilevel index in response to an indication by said machine signalling means, whereby a last generated level is an apex level for the multilevel index.

37. A system of generating a multilevel compressed index as defined in claim 35, including means for machine signalling a continuing signal that generating should start for a next higher level when plural index blocks are generated at any current level upon activation of said machine terminating means for the current level, means for machine generating a next higher level in said compressed multilevel index in response to said continuing signal, and means for machine ending the compressed index generation upon said machine signalling means ending the continuing signal when only one block comprises the next higher level, whereby said one block is an apex compressed block for the multilevel compressed index.

38. A system of generating a multilevel index as defined in claim 37, including means for machine storing a pointer to said last index block in a predetermined location for future accessing of the multilevel compressed index.

39. A system of generating each high level of a compressed index, comprising means for machine assembling a sequence of boundary pairs of uncompressed keys used in the generation of a plurality of blocks in a next lower level of the compressed index, means for machine assigning a respective pointer to each of said boundary pairs, said pointer being related to the address of a related one of the blocks in the next lower level, means for machine grouping said boundary pairs and said respective pointers in sequence for the generating of index blocks in said high level, and means for machine recognizing a null condition as a first uncompressed key in the sequence of boundary pairs, and means for machine storing a plurality of groupings of said boundary pairs of uncompressed keys in preparation for the generation of a high level of said index.

40. A system of generating a high level of a compressed index as defined in claim 39, comprising means for machine reading the groupings of uncompressed keys in the sequence stored by said machine storing means, means for machine compressing the uncompressed keys in each grouping to provide compressed keys, means for machine recording said compressed keys in sequential pairs with a related one of said pointers to provide each compressed index entry for said high level, means for machine blocking said entries in their generated sequence for each group of uncompressed keys to generate each high level block, and means for reactivating the preceding steps for each group for said high level until an end is reached for the groups of compressed keys provided by said machine reading means, whereby the end of the index at said high level is reached upon said machine compressing means reaching the end of the compressed keys provided by said machine reading means.

41. A system as defined in claim 40 for generating a next higher level in a multilevel index, including means for reactuating said machine assembling means, said machine assigning means, said machine grouping means, said machine storing means, said machine reading means, said machine compressing means, said machine recording means, and said machine blocking means until the next higher level is completed.

42. A system as defined in claim 41 for generating a multilevel index, including means for ending the construction of said index as soon as any high level compressed index is completed with a single index block.

PO-1050 (5/69)

UNITED STATES PATENT OFFICE
CERTIFICATE OF CORRECTION

Patent No. 3,603,937 Dated September 7, 1971

Inventor(s) Edward Loizides, Et al

It is certified that error appears in the above-identified patent and that said Letters Patent are hereby corrected as shown below:

Column 11, line 41, the word "UK+s" should read --UK's--. Column 13, line 44, insert --data--before the word "base". Column 19, line 5, "734"should read --743--; line 14, "734" should read --743--. Column 22, line 15, "574A" should read --573A--. Column 23, line 23, "CPI" should read --CPU--; line 38, "590" should read --591--. Column 24, line 33, "ans" should read --and--; line 72, "584" should read --584A--. Column 31, line 16, "of" should read --for--.

Signed and sealed this 29th day of February 1972.

(SEAL)
Attest:

EDWARD M.FLETCHER,JR.
Attesting Officer

~~ROBERT GOTTSCHALK~~
Commissioner of Patents